(12) United States Patent
Tago et al.

(10) Patent No.: US 12,060,697 B2
(45) Date of Patent: Aug. 13, 2024

(54) WORK MACHINE FOR DETERMINING CONDITION FOR RECORDING AND RETAINING VIDEO

(71) Applicant: HITACHI CONSTRUCTION MACHINERY CO., LTD., Tokyo (JP)

(72) Inventors: Hisashi Tago, Kashiwa (JP); Takenori Hiroki, Ami-machi (JP); Daiki Machida, Tsuchiura (JP); Naoki Hagiwara, Kasumigaura (JP); Taiki Aizawa, Tsuchiura (JP); Kouhei Hashimoto, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/910,873

(22) PCT Filed: Apr. 9, 2021

(86) PCT No.: PCT/JP2021/015064
§ 371 (c)(1),
(2) Date: Sep. 12, 2022

(87) PCT Pub. No.: WO2021/241033
PCT Pub. Date: Dec. 2, 2021

(65) Prior Publication Data
US 2023/0123942 A1    Apr. 20, 2023

(30) Foreign Application Priority Data
May 29, 2020    (JP) .................. 2020-094877

(51) Int. Cl.
*E02F 9/26*    (2006.01)
*E02F 9/20*    (2006.01)
(Continued)

(52) U.S. Cl.
CPC ............ *E02F 9/261* (2013.01); *E02F 9/2004* (2013.01); *E02F 9/24* (2013.01); *G06T 11/00* (2013.01);
(Continued)

(58) Field of Classification Search
CPC . E02F 9/261; E02F 9/2004; E02F 9/24; E02F 9/2228; E02F 9/2285; E02F 9/2292;
(Continued)

(56) References Cited

U.S. PATENT DOCUMENTS

2013/0088593 A1    4/2013   Ishimoto
2016/0344931 A1*  11/2016   Husted .................. H04N 23/698
(Continued)

FOREIGN PATENT DOCUMENTS

CN    107075840 A    8/2017
CN    108699817 A    10/2018
(Continued)

OTHER PUBLICATIONS

International Preliminary Report on Patentability received in corresponding International Application No. PCT/JP2021/015064 dated Dec. 8, 2022.
(Continued)

*Primary Examiner* — Terrell M Robinson
(74) *Attorney, Agent, or Firm* — MATTINGLY & MALUR, PC

(57) ABSTRACT

A work machine includes: a machine body; an actuator attached to the machine body; an operation device used to operate the actuator; an operation sensor that senses an operation of the operation device; a photographing device that photographs surroundings of the machine body; a video data recording device that records video data including video photographed by the photographing device; a controller that controls the video data recording device; and an
(Continued)

object sensor that senses an object in the surroundings of the machine body. The controller determines whether or not a recording and retaining condition including a condition that an object is present in the surroundings of the machine body and a condition that the operation device is operated is satisfied on the basis of a result of sensing in the object sensor and a result of sensing in the operation sensor, and makes the video data recording device record and retain the video data when the recording and retaining condition is satisfied.

7 Claims, 11 Drawing Sheets

(51) Int. Cl.
*E02F 9/24* (2006.01)
*G06T 11/00* (2006.01)
*H04N 5/265* (2006.01)
*H04N 5/765* (2006.01)
*H04N 7/18* (2006.01)
*E02F 9/22* (2006.01)

(52) U.S. Cl.
CPC .............. *H04N 5/265* (2013.01); *H04N 5/765* (2013.01); *H04N 7/183* (2013.01); *E02F 9/2228* (2013.01); *E02F 9/2285* (2013.01); *E02F 9/2292* (2013.01); *E02F 9/2296* (2013.01)

(58) Field of Classification Search
CPC ....... E02F 9/2296; G06T 11/00; H04N 5/265; H04N 5/765; H04N 7/183
See application file for complete search history.

(56) References Cited

U.S. PATENT DOCUMENTS

| | | | |
|---|---|---|---|
| 2017/0284069 A1* | 10/2017 | Machida | ................... B60R 1/00 |
| 2017/0305018 A1 | 10/2017 | Machida et al. | |
| 2018/0007323 A1* | 1/2018 | Botusescu | .............. H04N 5/765 |
| 2019/0112791 A1 | 4/2019 | Ariga et al. | |
| 2020/0063397 A1* | 2/2020 | Hatake | ................... E02F 9/2004 |
| 2020/0175790 A1* | 6/2020 | Kreiner | ............ G08B 13/19676 |
| 2021/0246626 A1 | 8/2021 | Yamamoto | |

FOREIGN PATENT DOCUMENTS

| | | |
|---|---|---|
| JP | 2004-224105 A | 8/2004 |
| JP | 2007-085091 A | 4/2007 |
| JP | 2015-210775 A | 11/2015 |
| WO | 2011158955 A1 | 12/2011 |
| WO | 2020/095945 A1 | 5/2020 |

OTHER PUBLICATIONS

International Search Report of PCT/JP2021/015064 dated May 18, 2021.
Chinese Office Action received in corresponding Chinese Application No. 202180020667.6 dated Feb. 1, 2024.
Extended European Search Report received in corresponding European Application No. 21814363.4 dated Feb. 29, 2024.

* cited by examiner

WORK MACHINE FOR DETERMINING CONDITION FOR RECORDING AND RETAINING VIDEO

TECHNICAL FIELD

The present invention relates to a work machine.

BACKGROUND ART

There has been known an automobile which includes a drive recorder device that records a video of surroundings of the own vehicle which is photographed by a camera with a purpose of investigating a cause when the automobile comes into contact with an object. When the recording is performed for a whole time during operation of the automobile, an amount of video data is increased, and it takes time and labor to extract the video data of a necessary scene. When overwriting processing that sequentially deletes old data and rewrites new data is performed in order to reduce the amount of the video data, the video data of the necessary scene may be deleted by overwriting. Hence, it is desirable to start recording a video in the necessary scene.

Patent Document 1 discloses a drive recorder device that includes impact detecting means for detecting an impact on the own vehicle and stored information saving means for storing and retaining stored information stored by storing means when the impact detecting means detects an impact equal to or more than a preset value.

PRIOR ART DOCUMENT

Patent Document

Patent Document 1: JP-2004-224105-A

SUMMARY OF THE INVENTION

Problem to be Solved by the Invention

A work machine such as a hydraulic excavator that operates on a construction work site or the like is also desired to record and retain video data of the surroundings of the own work machine. However, an impact is frequently generated on the work machine during work. Therefore, when the work machine is configured to record and retain the video data in response to the detection of an impact, the video data is recorded and retained frequently, thus decreasing accuracy of recording and retaining a necessary scene, that is, recording accuracy.

It is an object of the present invention to improve accuracy of recording a necessary scene.

Means for Solving the Problem

A work machine according to one aspect of the present invention includes a machine body; an actuator attached to the machine body; an operation device used to operate the actuator; an operation sensor that senses an operation of the operation device; a photographing device that photographs surroundings of the machine body; a video data recording device that records video data including a video photographed by the photographing device; a controller that controls the video data recording device; and an object sensor that senses an object in the surroundings of the machine body, in which the controller is configured to determine whether or not a recording and retaining condition including a condition that an object is present in the surroundings of the machine body and a condition that the operation device is operated is satisfied on the basis of a result of sensing in the object sensor and a result of sensing in the operation sensor, and make the video data recording device record and retain the video data when the recording and retaining condition is satisfied.

Advantages of the Invention

According to the present invention, it is possible to improve accuracy of recording a necessary scene.

MODES FOR CARRYING OUT THE INVENTION

A work machine and a management system thereof according to an embodiment of the present invention will be described with reference to the drawings. The work machine is a machine used for various kinds of work such as civil engineering work, construction work, and demolition work. In the present embodiment, there will be made a description of an example in which the work machine is a hydraulic excavator 1 of a crawler type.

Figure 1:
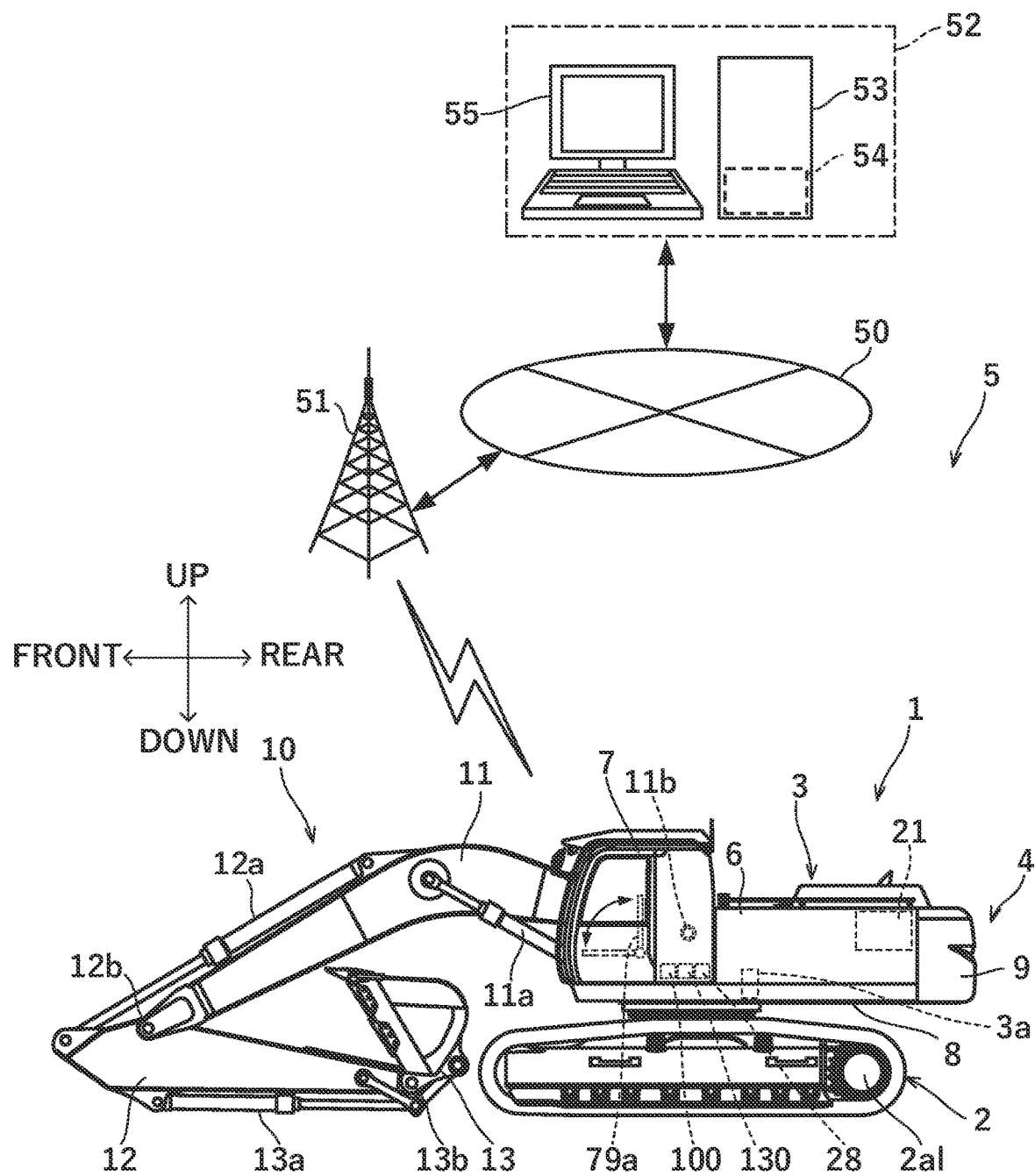
FIG. 1 is a diagram depicting a configuration of a management system of a hydraulic excavator.

FIG. 1 is a diagram depicting a configuration of a management system 5 of the hydraulic excavator 1. As depicted in FIG. 1, the management system 5 includes the hydraulic excavator 1 that performs work on a work site and a management server 53 installed in a management center 52. The management center 52 is, for example, installed in facilities such as a headquarters, a branch office, or a factory of a manufacturer (maker) of the hydraulic excavator 1, a rental company of the hydraulic excavator 1, a data center specializing in management of servers, facilities of an owner owning the hydraulic excavator 1, or the like. The management server 53 is an external device that remotely manages (grasps and monitors) the state of the hydraulic excavator 1.

The management system 5 is configured to be able to perform two-way communication between the hydraulic excavator 1 that performs work on the work site and the management server 53 installed at a location remote from the work site via a communication line 50 of a wide area network. That is, the hydraulic excavator 1 and the management server 53 can transmit and receive information (data) via the communication line 50. The communication line 50 is a mobile telephone communication network (mobile communication network) operated by a mobile telephone operator or the like, the Internet, or the like. In a case where the hydraulic excavator 1 and a wireless base station 51 are connected to each other by the mobile telephone communication network (mobile communication network), as depicted in the figure, for example, when the wireless base station 51 receives predetermined information from the hydraulic excavator 1, the wireless base station 51 transmits the received information to the management server 53 via the Internet.

The management server 53 receives machine body information such as operation information, warning information, and recording information received from the hydraulic excavator 1, and stores the machine body information in a storage device 54 such as a hard disk drive. The management server 53 causes a display device 55 such as a liquid crystal display device to display the information stored in the storage device 54 thereon. A manager can grasp the state of the hydraulic excavator 1 by operating the management server 53 and displaying the information on the predetermined hydraulic excavator 1 on the display device 55. For example, the management server 53 stores video data transmitted from the hydraulic excavator 1 in the storage device 54, and displays a video of the surroundings of the hydraulic excavator 1 (a synthetic video 199 depicted in FIG. 7) on a display screen of the display device 55 on the basis of the stored video data.

The hydraulic excavator 1 includes a machine body (vehicle body) 4 and a work device 10 attached to the machine body 4. The machine body 4 includes a track structure 2 and a swing structure 3 provided so as to be swingable on the track structure 2. The work device 10 is attached to a front portion of the swing structure 3. The track structure 2 includes a left side travelling hydraulic motor 2al for driving a crawler on a left side and a right side travelling hydraulic motor 2ar (see FIG. 3) for driving a crawler on a right side. The track structure 2 travels by driving the pair of left and right crawlers by the travelling hydraulic motors 2al and 2ar. The swing structure 3 swings by driving a swing hydraulic motor 3a.

The swing structure 3 includes: a swing frame 8; a cab 7 provided on the left side of a front portion of the swing frame 8; a counterweight 9 provided to a rear portion of the swing frame 8; and an engine compartment 6 provided on the rear side of the cab 7 in the swing frame 8. The engine compartment 6 houses an engine 21 as a prime mover and a hydraulic instrument such as a hydraulic pump driven by the engine 21. The work device 10 is rotatably connected to a center of the front portion of the swing frame 8. The engine 21 is a power source of the hydraulic excavator 1. The engine 21 is, for example, constituted by an internal combustion engine such as a diesel engine.

The work device 10 is an articulated work device including a plurality of front implement members rotatably connected to each other and a plurality of hydraulic cylinders (actuators) for driving the front implement members. In the present embodiment, a boom 11, an arm 12, and a bucket 13 as three front implement members are connected in series with each other. A proximal end portion of the boom 11 is rotatably connected in the front portion of the swing frame 8 by a boom pin 11b. A proximal end portion of the arm 12 is rotatably connected in a distal end portion of the boom 11 by an arm pin 12b. The bucket 13 is rotatably connected in a distal end portion of the arm 12 by a bucket pin 13b.

The boom 11 is driven by a hydraulic cylinder (hereinafter described also as a boom cylinder 11a), and is rotated with respect to the swing frame 8. The arm 12 is driven by a hydraulic cylinder (hereinafter described also as an arm cylinder 12a), and is rotated with respect to the boom 11. The bucket 13 is driven by a hydraulic cylinder (hereinafter described also as a bucket cylinder 13a), and is rotated with respect to the arm 12. The boom cylinder 11a has one end side thereof connected to the boom 11, and has another end side thereof connected to the swing frame 8. The arm cylinder 12a has one end side thereof connected to the arm 12, and has another end side thereof connected to the boom 11. The bucket cylinder 13a has one end side thereof connected to the bucket 13 via a link member, and has another end side thereof connected to the arm 12. Work such as excavation or leveling of natural ground is performed by driving each hydraulic cylinder of the work device 10.

Provided within the cab 7 are: a controller 100 that controls various parts of the hydraulic excavator 1; a video data recording device 130 that records a video photographed by a plurality of photographing devices 30 (see FIG. 3) together with machine body information; and a battery 28 as a power supply device that supplies electric power to instruments mounted in the hydraulic excavator 1.

Figure 2:
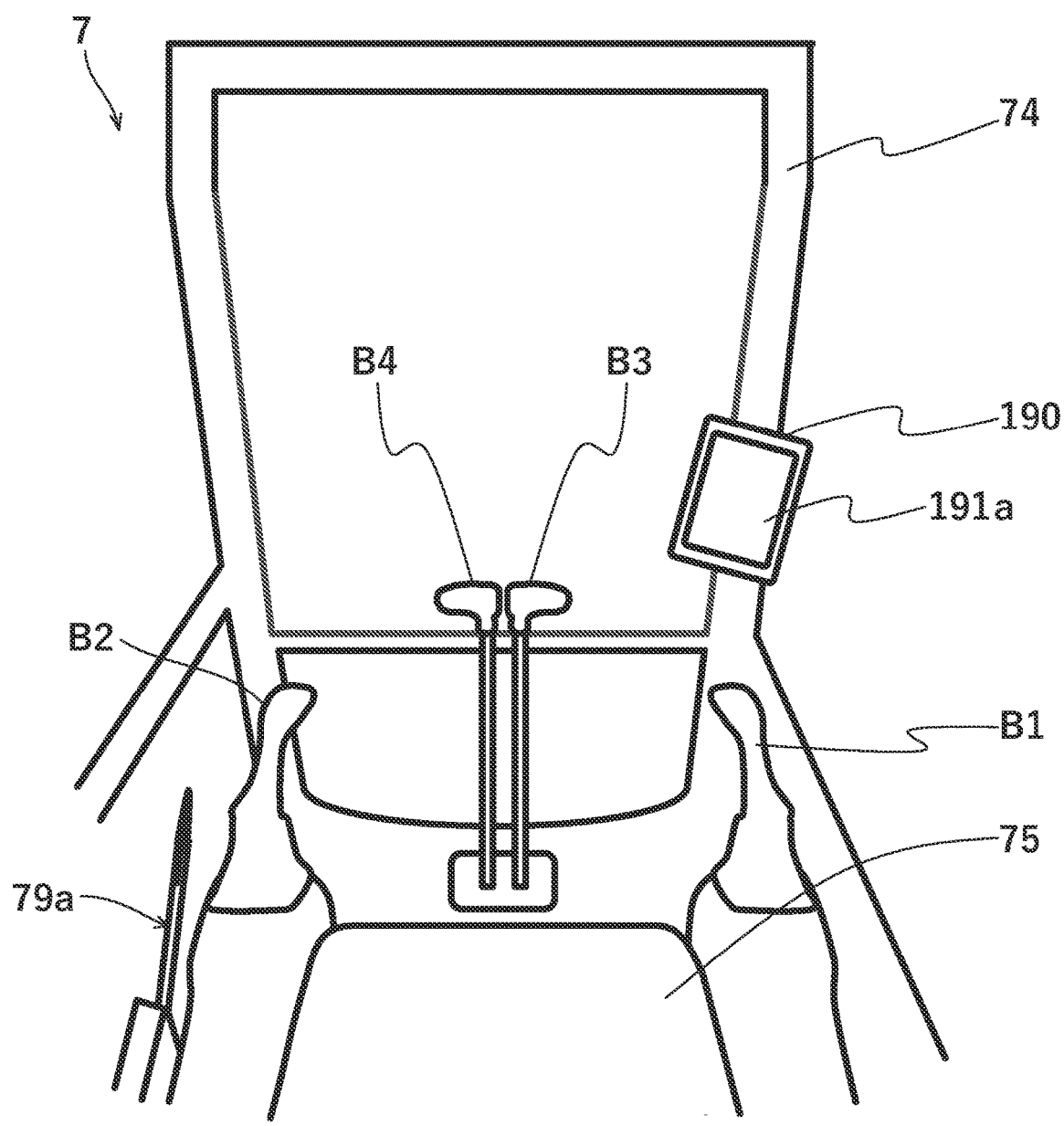
FIG. 2 is a schematic diagram of the inside of a cab as viewed toward the front from the rear side of a cab seat.

FIG. 2 is a schematic diagram of the inside of the cab 7 as viewed toward the front from the rear side of a cab seat 75. As depicted in FIG. 2, provided within the cab 7 are: the cab seat 75 on which an operator is to be seated; control levers (B1 to B4) for operating various parts of the hydraulic excavator 1; and a display device 190 that displays a predetermined display image on a display screen 191a. The display device 190 is attached to a pillar 74 on the right side as viewed from the cab seat 75 side. The display device 190 is, for example, a touch panel monitor functioning as an input unit and a display unit. The display device 190 displays a synthetic video 199 (see FIG. 7) obtained by synthesizing an image of predetermined icons, a message, and the like and a video of the surroundings of the machine body 4 on the display screen 191a on the basis of a control signal from a monitor controller 120 (see FIG. 3).

A right control lever B1 for operating the bucket 13 and operating the boom 11 is provided on the right side of the cab seat 75. A left control lever B2 for operating the swing structure 3 and operating the arm 12 is provided on the left side of the cab seat 75. A pair of left and right travelling levers (a left travelling lever B4 and a right travelling lever B3) are provided on the front side of the cab seat 75. The left travelling lever B4 is a control lever for operating the crawler on the left side. The right travelling lever B3 is a control lever for operating the crawler on the right side.

A lock lever 79a is provided on the left side (door side) of the left side control lever B2. The lock lever 79a is a member that can be selectively operated between a lock position (raised position) at which the entering or exiting of the cab 7 is allowed and a lock release position (lowered position) at which the entering or exiting of the cab 7 is prohibited.

Figure 3:
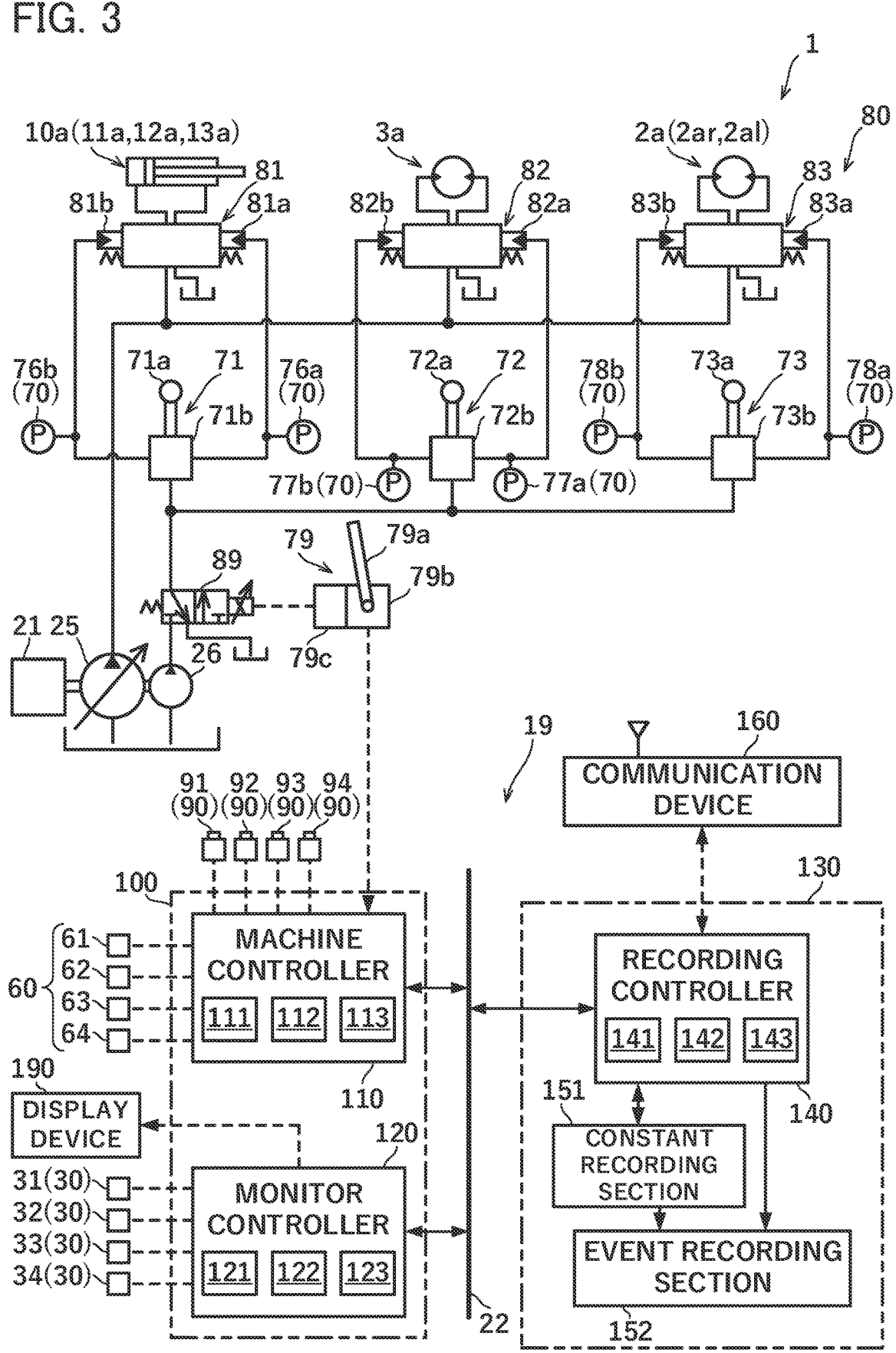
FIG. 3 is a diagram depicting a main configuration of the hydraulic excavator.

FIG. 3 is a diagram depicting a main configuration of the hydraulic excavator 1. FIG. 3 depicts a hydraulic system 80 and a surrounding monitoring system 19 mounted in the hydraulic excavator 1. Incidentally, in the following, the boom cylinder 11a, the arm cylinder 12a, and the bucket cylinder 13a will be collectively described as a hydraulic cylinder 10a, and the left side travelling hydraulic motor 2al and the right side travelling hydraulic motor 2ar will be collectively described as a travelling hydraulic motor 2a. The hydraulic system 80 is provided with a plurality of hydraulic cylinders 10a (11a, 12a, and 13a). However, FIG. 3 representatively illustrates one hydraulic cylinder 10a. Similarly, the hydraulic system 80 is provided with a pair of travelling hydraulic motors 2a. However, FIG. 3 representatively illustrates one travelling hydraulic motor 2a.

As depicted in FIG. 3, the hydraulic system 80 includes: a main pump 25 as a variable displacement hydraulic pump driven by the engine 21; a pilot pump 26 as a fixed displacement hydraulic pump driven by the engine 21; a plurality of hydraulic actuators (the hydraulic cylinder 10a, the swing hydraulic motor 3a, and the travelling hydraulic motor 2a) driven by hydraulic operating fluid (hydraulic fluid) as working fluid delivered from the main pump 25; and control valves 81, 82, and 83 that respectively control flows of the hydraulic operating fluid supplied from the main pump 25 to the respective hydraulic actuators.

The hydraulic operating fluid delivered from the pilot pump 26 is supplied to operation devices (a work operation device 71, a swing operation device 72, and a travelling operation device 73) used to operate the actuators. The work operation device 71 is an actuator operation device that commands operation of the hydraulic cylinder 10a of the work device 10. The work operation device 71 includes a control lever (corresponding to the right control lever B1 and the left control lever B2 in FIG. 2) 71a tilted by an operator and a pair of pressure reducing valves 71b of a hydraulic pilot type. The swing operation device 72 is an actuator operation device that commands operation of the swing hydraulic motor 3a. The swing operation device 72 includes a control lever (corresponding to the left control lever B2 in FIG. 2) 72a tilted by the operator and a pair of pressure reducing valves 72b of a hydraulic pilot type. The travelling operation device 73 is an actuator operation device that commands operation of the travelling hydraulic motor 2a. The travelling operation device 73 includes a control lever (corresponding to the right travelling lever B3 and the left travelling lever B4 in FIG. 2) 73a tilted by the operator and a pair of pressure reducing valves 73b of a hydraulic pilot type.

The pressure reducing valves 71b, 72b, and 73b of the actuator operation devices 71, 72, and 73 generate pilot pressures (which may be referred to as operation pressures) corresponding to operation amounts and operation directions of the control levers 71a, 72a, and 73a with the delivery pressure of the pilot pump 26 as a source pressure. The thus generated pilot pressures are introduced into pressure receiving chambers 81a, 81b, 82a, 82b, 83a, and 83b of the control valves 81, 82, and 83 corresponding to the hydraulic actuators (10a, 3a, and 2a), and are used as commands (signals) for operating the actuators by driving the control valves 81, 82, and 83.

The hydraulic operating fluid delivered from the main pump 25 is supplied to the hydraulic actuators (the hydraulic cylinder 10a, the swing hydraulic motor 3a, and the travelling hydraulic motor 2a) through the control valves 81, 82, and 83 to drive the work device 10, the swing structure 3, and the track structure 2, respectively.

The hydraulic excavator 1 includes a plurality of actuator operation sensors 70 as operation sensors that sense operations of the plurality of actuator operation devices 71, 72, and 73. The plurality of actuator operation sensors 70 include work operation sensors 76a and 76b, swing operation sensors 77a and 77b, and travelling operation sensors 78a and 78b. In the present embodiment, the actuator operation sensors 76a, 76b, 77a, 77b, 78a, and 78b are pressure sensors provided to pilot lines that connect the actuator operation devices 71, 72, and 73 to the pressure receiving chambers 81a, 81b, 82a, 82b, 83a, and 83b of the control valves 81, 82, and 83. The actuator operation sensors 76a, 76b, 77a, 77b, 78a, and 78b sense operation pressures (operation amounts) generated by operation of the control levers 71a, 72a, and 73a by the operator. That is, the work operation sensors 76a and 76b sense an operation for operating the work device 10 (hydraulic cylinder 10a), the swing operation sensors 77a and 77b sense an operation for operating (swinging) the swing structure 3, and the travelling operation sensors 78a and 78b sense an operation for operating (travelling) the track structure 2. The actuator operation sensors 76a, 76b, 77a, 77b, 78a, and 78b are connected to a machine controller 110 of the controller 100, and output information about the sensed operation amounts to the machine controller 110.

A shut-off valve 89 is a solenoid selector valve that is provided to a pilot line connecting the pilot pump 26 to the pressure reducing valves 71b, 72b, and 73b of the actuator operation devices 71, 72, and 73, and is switchable between a communication position at which the supply of a pilot pressure from the pilot pump 26 to the pressure reducing valves 71b, 72b, and 73b is allowed and an interruption position at which the supply of the pilot pressure from the pilot pump 26 to the pressure reducing valves 71b, 72b, and 73b is prohibited. The shut-off valve 89 is operated by a lock lever device 79.

The lock lever device 79 is an operation device used to operate the actuators. The lock lever device 79 includes: a lock lever 79a to be selectively operated between a lock position (raised position) at which the entering or exiting of the cab 7 is allowed and operation of the actuators (10a, 3a, and 2a) by the actuator operation devices 71, 72, and 73 is disabled and a lock release position (lowered position) at which the entering or exiting of the cab 7 is prohibited and operation of the actuators (10a, 3a, and 2a) by the actuator operation devices 71, 72, and 73 is enabled; a shut-off relay 79c for supplying or interrupting electric power from the battery 28; and a lock lever operation sensor 79b as an operation sensor that senses an operation of the lock lever 79a of the lock lever device 79.

When the lock lever 79a is operated to the lock release position, the shut-off relay 79c is turned on, that is, the shut-off relay 79c is set in a closed state, so that electric power is supplied from the battery 28 to the shut-off valve 89. When electric power is supplied to the shut-off valve 89, the solenoid is excited, and the shut-off valve 89 is switched to the communication position. Therefore, in a state in which the lock lever 79a is in the lock release position, command pilot pressures corresponding to operation amounts of the control levers 71a, 72a, and 73a are generated by the pressure reducing valves 71b, 72b, and 73b, and the hydraulic actuators (10a, 3a, and 2a) corresponding to the operated control levers 71a, 72a, and 73a operate.

When the lock lever 79a is operated to the lock position, the shut-off relay 79c is turned off, that is, the shut-off relay 79c is set in an opened state, so that the supply of electric power from the battery 28 to the shut-off valve 89 is interrupted. When the supply of electric power to the shut-off valve 89 is interrupted, the solenoid is demagnetized, and the shut-off valve 89 is switched to the interruption position. Thus, the pilot source pressure to the pressure reducing valves 71b, 72b, and 73b is interrupted, and operation using the control levers 71a, 72a, and 73a is disabled.

The lock lever operation sensor 79b senses an operation position of the lock lever 79a, and outputs a signal indicating a result of the sensing to the machine controller 110 of the controller 100.

The surrounding monitoring system 19 is a system for monitoring the surroundings of the machine body 4. The surrounding monitoring system 19 includes: the plurality of photographing devices 30 that photograph the surroundings of the machine body 4; the display device 190 that displays a video photographed by the photographing devices 30 on the display screen 191a; the video data recording device 130 that records video data including the video photographed by the photographing devices 30; the controller 100 that controls the display device 190 and the video data recording device 130; a plurality of object sensors 90 that sense an object in the surroundings of the machine body 4; and a communication device 160 for performing wireless communication with the management server 53 as an external device installed on the outside of the hydraulic excavator 1.

The display device 190 functions also as a notifying device that displays information regarding presence of an object on the display screen 191a when the object is present in the surroundings of the hydraulic excavator 1, and which notifies the operator of the hydraulic excavator 1 of sensing of the object. The communication device 160 is a wireless communication device capable of wireless communication with the wireless base station 51 connected to the communication line 50 as a wide area network. The communication device 160 has a communication interface including a communication antenna having a band such, for example, as a 2.1-GHz band as a reception band. The communication device 160 transmits and receives information to and from the management server 53 and the like via the wireless base station 51 and the communication line 50.

The controller 100 includes: the machine controller 110 that controls various parts of the hydraulic excavator 1 in a centralized manner; and the monitor controller 120 that displays information (data) regarding the operation state of the hydraulic excavator 1 and the video photographed by the photographing devices 30 on the display screen 191a of the display device 190. The machine controller 110 controls the valves, pumps, and the like of the hydraulic system 80 on the basis of posture information of the hydraulic excavator 1, operation information, information about loads on the actuators, and the like. The monitor controller 120 generates a synthetic video 199 by synthesizing the video photographed by the plurality of photographing devices 30 and an image generated on the basis of a result of sensing in the object sensors 90, and displays the generated synthetic video 199 on the display screen 191a of the display device 190 (see FIG. 7). The monitor controller 120 transmits data of the generated synthetic video 199 (which will hereinafter be described also as synthetic video data) to the video data recording device 130.

The video data recording device 130 includes a recording controller 140, a constant recording section 151 as a recording device, and an event recording section 152 as a recording device. For example, the constant recording section 151 is a volatile memory or a nonvolatile memory, and the event recording section 152 is a nonvolatile memory provided separately from the constant recording section 151. The recording controller 140 constantly records the synthetic video data generated by the monitor controller 120 in the constant recording section 151. When the recording controller 140 receives a recording trigger signal from the machine controller 110, the recording controller 140 records and retains the synthetic video data recorded in the constant recording section 151.

The machine controller 110 determines whether or not a recording and retaining condition is satisfied on the basis of a result of sensing in the object sensors 90 and a result of sensing in the operation sensors (the lock lever operation sensor 79b and the actuator operation sensors 70). When the recording and retaining condition is satisfied, the machine controller 110 transmits the recording trigger signal to the video data recording device 130, and thereby makes the video data recording device 130 record and retain the synthetic video data.

The recording controller 140 transmits the recorded and retained synthetic video data to the management server 53 (see FIG. 1) by wireless communication by use of the communication device 160. The management server 53 stores the received synthetic video data in the storage device 54 (see FIG. 1).

The machine controller 110, the monitor controller 120, and the recording controller 140 are constituted by microcomputers including CPUs (Central Processing Units) 111, 121, and 141 as operation circuits, ROMs (Read Only Memories) 112, 122, and 142 as storage devices, RAMs (Random Access Memories) 113, 123, and 143 as storage devices, input-output interfaces (I/O interfaces), and other peripheral circuits. Each of the controllers 110, 120, and 140 may be constituted by one microcomputer, or may be constituted by a plurality of microcomputers.

The ROMS 112, 122, and 142 of the respective controllers 110 are a nonvolatile memory such as an EEPROM. The ROMS 112, 122, and 142 store a program capable of performing various kinds of computation. That is, the ROMS 112, 122, and 142 of the respective controllers 110, 120, and 140 are storage media from which a program that implements functions of the present embodiment is readable. The RAMs 113, 123, and 143 are a volatile memory, and are a work memory between which and the CPUs 111, 121, and 141 data is directly input and output. The RAMs 113, 123, and 143 temporarily store necessary data while the CPUs 111, 121, and 141 execute the programs by computation. Incidentally, each of the controllers 110, 120, and 140 may further include a storage device such as a flash memory or a hard disk drive.

The CPUs 111, 121, and 141 are processing devices that expand control programs stored in the ROMS 112, 122, and 142 into the RAMs 113, 123, and 143 and execute the control programs by computation. The CPUs 111, 121, and 141 perform predetermined computation processing on signals captured from the input-output interfaces, the ROMS 112, 122, and 142, and the RAMs 113, 123, and 143 according to the control programs. Signals from various kinds of devices are input to the input-output interfaces. The input-output interfaces convert the input signals such that the signals can be subjected to computation by the CPUs 111, 121, and 141. The input-output interfaces generate signals for output according to results of computation in the CPUs 111, 121, and 141, and output the signals to various kinds of devices.

The controllers 110, 120, and 140 are connected to each other via a vehicle-mounted network 22 referred to as a CAN (Controller Area Network). Hence, the controllers 110, 120, and 140 can mutually transmit and receive information.

Figure 4:
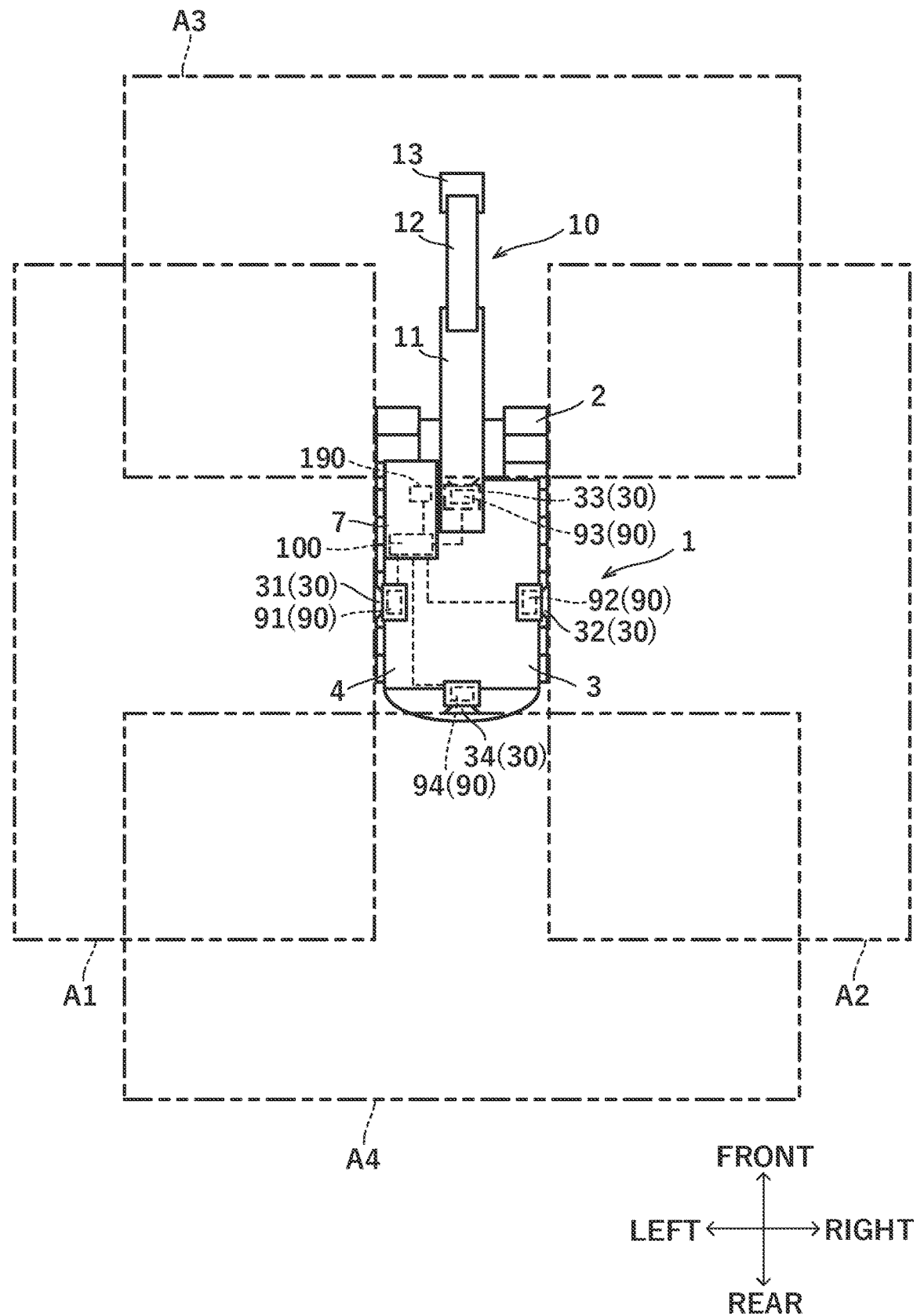
FIG. 4 is a plan schematic view of the hydraulic excavator, and depicts photographing ranges of a plurality of photographing devices.

FIG. 4 is a plan schematic view of the hydraulic excavator 1. FIG. 4 depicts photographing ranges of the plurality of photographing devices 30. As depicted in FIG. 4, the plurality of photographing devices 30 are attached to the swing structure 3. The plurality of photographing devices 30 include a left camera 31 that photographs in a left direction of the swing structure 3, a right camera 32 that photographs in a right direction of the swing structure 3, a front camera 33 that photographs in a forward direction of the swing structure 3, and a rear camera 34 that photographs in a rearward direction of the swing structure 3. Each of the photographing devices 30 (31, 32, 33, and 34) is, for example, a wide-angle video camera including a CCD, CMOS, or another imaging element excellent in durability and weatherability and a wide-angle lens.

The left camera 31 is a photographing device that continuously photographs a region on the left side of the swing structure 3 in such a direction as to obliquely look down on the region with a left-right angle of view of approximately 180°. The right camera 32 is a photographing device that continuously photographs a region on the right side of the swing structure 3 in such a direction as to obliquely look down on the region with a left-right angle of view of approximately 180°. The front camera 33 is a photographing device that continuously photographs a region in front of the swing structure 3 in such a direction as to obliquely look down on the region with a left-right angle of view of approximately 180°. The rear camera 34 is a photographing device that continuously photographs a region in the rear of the swing structure 3 in such a direction as to obliquely look down on the region with a left-right angle of view of approximately 180°. Incidentally, the front camera 33 is attached below the boom 11 of the work device 10 to a position not interfering with the work device 10.

In the figure, rectangular areas (A1, A2, A3, and A4) in the surroundings of the hydraulic excavator 1 represent regions that can be photographed by the respective cameras 31, 32, 33, and 34. Each of the photographing regions A1, A2, A3, and A4 is photographed so as to overlap adjacent areas in parts at both end portions in the longitudinal direction of the photographing region. The photographing regions A1, A2, A3, and A4 are set so as to include a caution zone S2 to be described later.

The plurality of object sensors 90 are attached to the swing structure 3. The plurality of object sensors 90 include a left object sensor 91 that senses an object present in the left direction of the swing structure 3, a right object sensor 92 that senses an object present in the right direction of the swing structure 3, a front object sensor 93 that senses an object present in the forward direction of the swing structure 3, and a rear object sensor 94 that senses an object present in the rearward direction of the swing structure 3.

The left object sensor 91 is attached in the vicinity of the left camera 31, and monitors the region on the left side of the swing structure 3. A monitoring region of the left object sensor 91 is substantially the same as the photographing region A1 of the left camera 31. The right object sensor 92 is attached in the vicinity of the right camera 32, and monitors the region on the right side of the swing structure 3. A monitoring region of the right object sensor 92 is substantially the same as the photographing region A2 of the right camera 32. The front object sensor 93 is attached in the vicinity of the front camera 33, and monitors the region on the front side of the swing structure 3. A monitoring region of the front object sensor 93 is substantially the same as the photographing region A3 of the front camera 33. The rear object sensor 94 is attached in the vicinity of the rear camera 34, and monitors the region on the rear side of the swing structure 3.

The object sensors 90 each include a plurality of infrared sensors arranged in a matrix form in a vertical and a horizontal direction. The infrared sensors are a ToF (Time of Flight) sensor that measures a distance to an object from a time difference from the application of an infrared ray to the reflection of the infrared ray, and outputs a distance measurement result to the machine controller 110. In addition, the infrared sensor outputs a signal indicating the reflection intensity of the infrared ray reflected from the object to the machine controller 110.

Figure 5:
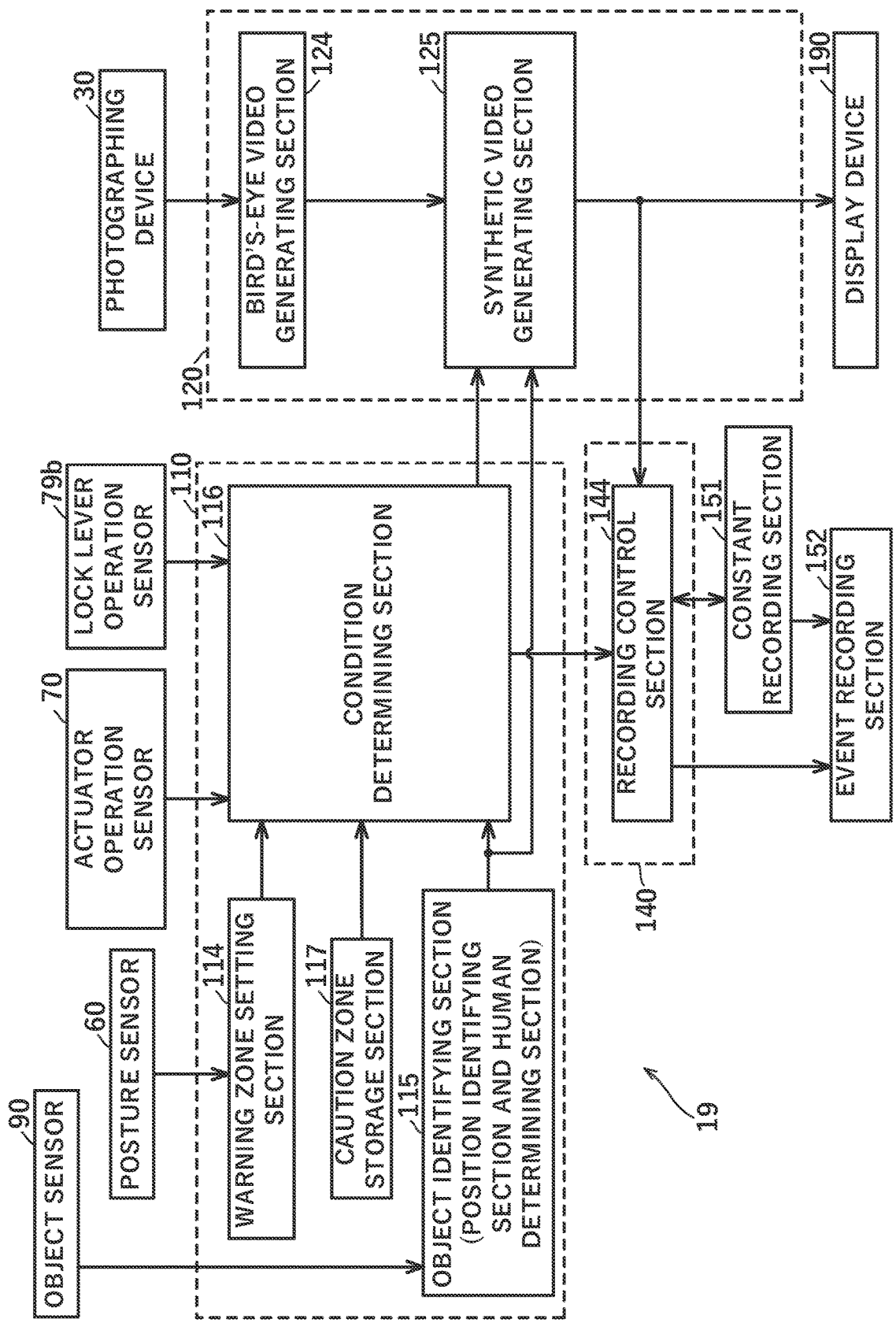
FIG. 5 is a functional block diagram depicting main functions of a surrounding monitoring system.

FIG. 5 is a functional block diagram depicting main functions of the surrounding monitoring system 19. Incidentally, while the plurality of object sensors 90, the plurality of actuator operation sensors 70, and the plurality of photographing devices 30 are provided, only one object sensor 90, one actuator operation sensor 70, and one photographing device 30 are depicted representatively. As depicted in FIG. 5, the machine controller 110 functions as a warning zone setting section 114, an object identifying section 115, and a condition determining section 116 by executing a program stored in the ROM 112.

The object identifying section 115 determines whether or not an object is present in the surroundings of the hydraulic excavator 1 on the basis of sensing information from the plurality of object sensors 90. When determining that an object is present in the surroundings of the hydraulic excavator 1, the object identifying section 115 identifies the position of the object in an excavator reference coordinate system on the basis of results of sensing in the object sensors 90 and information such as the position coordinates of the object sensors 90 in the excavator reference coordinate system and the attachment angles of the object sensors 90, the information being stored in the ROM 112.

Further, the object identifying section 115 determines whether or not the object sensed by the object sensors 90 is a human on the basis of the results of sensing in the object sensors 90. The object identifying section 115 determines that the object is a human when the reflection intensity of the infrared ray reflected from the object is within a predetermined range. The object identifying section 115 determines that the object is not a human when the reflection intensity of the infrared ray reflected from the object is outside the predetermined range. The above-described predetermined range is, for example, preset on the basis of the reflection intensity when the infrared ray is reflected by a reflective vest worn by a worker, the reflection intensity when the infrared ray is reflected by the skin of a human, or the like. The predetermined range of the reflection intensity for human determination is stored in the ROM 112.

The condition determining section 116 determines whether or not the object sensed by the object sensors 90 is present within a warning zone S1 on the basis of the position of the object with respect to the excavator which is identified by the object identifying section 115 and information regarding the warning zone S1 set by the warning zone setting section 114. In addition, the condition determining section 116 determines whether or not the object sensed by the object sensors 90 is present within the caution zone S2 on the basis of the position of the object with respect to the excavator which is identified by the object identifying section 115 and information regarding the caution zone S2 stored in a caution zone storage section 117.

The condition determining section 116 determines whether or not operation of the actuator by the actuator operation device 71, 72, or 73 is performed on the basis of a result of sensing in the actuator operation sensor 70. The condition determining section 116 determines that the actuator operation device 71, 72, or 73 is operated when a pilot pressure P sensed by the actuator operation sensor (pressure sensor) 70 is equal to or more than a threshold value P0. The condition determining section 116 determines that the actuator operation device 71, 72, or 73 is not operated when the pilot pressure P is less than the threshold value P0. Incidentally, the threshold value P0 is a threshold value for determining whether or not the actuator operation device 71, 72, or 73 is operated, and the threshold value P0 is stored in the ROM 112 of the machine controller 110 in advance. The pilot pressure P is a minimum value (tank pressure) Pmin when the control lever 71*a*, 72*a*, or 73*a* is in a dead band including a neutral position (operation angle θ=0). The pilot pressure P is a maximum value Pmax when the control lever 71*a*, 72*a*, or 73*a* is operated to a maximum operation position (operation angle θ=θmax). The threshold value P0 is a value larger than the minimum value Pmin and smaller than the maximum value Pmax (Pmin<P0<Pmax).

The condition determining section 116 determines whether the lock lever device 79 is operated to the lock release position or operated to the lock position on the basis of a result of sensing in the lock lever operation sensor 79*b*.

The condition determining section 116 determines whether or not predetermined storing and retaining conditions are satisfied. The condition determining section 116 transmits a recording trigger signal to the video data recording device 130 when any one of a first to a third storing and retaining condition is satisfied.

The first storing and retaining condition is satisfied when all of first to fourth conditions in the following are satisfied. The first storing and retaining condition is not satisfied when any one of the first to fourth conditions is not satisfied.

First condition: the lock lever 79*a* of the lock lever device 79 is operated to the lock release position Second condition: an object is present in the surroundings of the machine body 4

Third condition: the object is a human

Fourth condition: the object is present within a warning zone (first range) S1 preset in peripheral regions in the vicinity of the machine body 4, that is, a region within a swing range of the machine body 4 and a region close to the machine body 4 including swing trajectories of the boom 11, the arm 12, and the bucket 13.

The second storing and retaining condition is satisfied when all of the first condition, the second condition, the fourth condition, and a fifth condition in the following are satisfied. The second storing and retaining condition is not satisfied when any one of the first condition, the second condition, the fourth condition, and the fifth condition is not satisfied.

Fifth condition: operation using at least one of the actuator operation devices 71, 72, and 73 is performed The third storing and retaining condition is satisfied when all of the first to third conditions, the fifth condition, and a sixth condition in the following are satisfied. The third storing and retaining condition is not satisfied when any one of the first to third conditions, the fifth condition, and the sixth condition is not satisfied.

Sixth condition: the object is not present in the warning zone S1 but is present within a caution zone (second range) S2 preset so as to include the warning zone S1.

Figure 6:
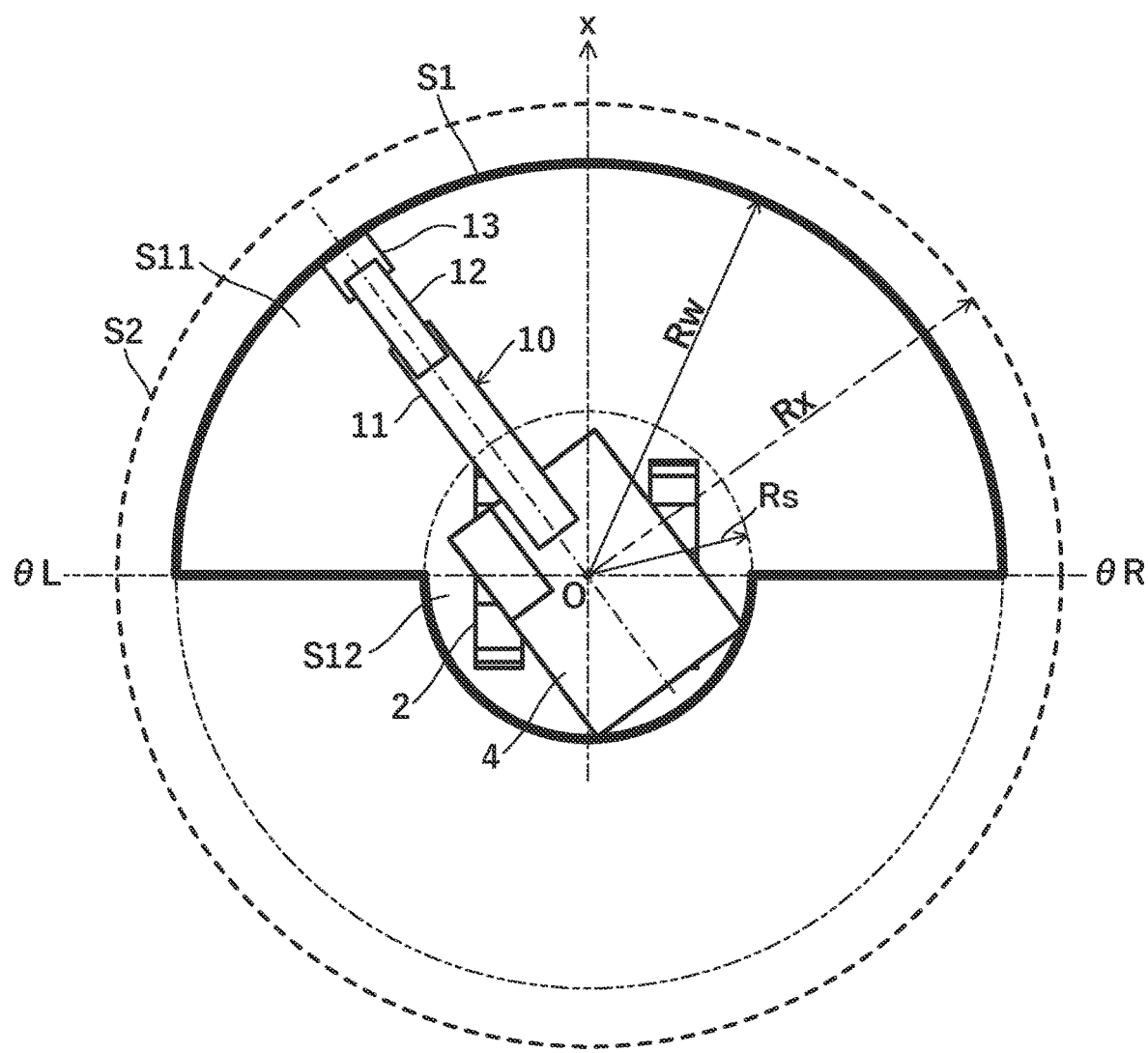
FIG. 6 is a diagram of the hydraulic excavator as viewed from above, and depicts a warning zone S1 and a caution zone S2 of the hydraulic excavator.

FIG. 6 is a diagram of the hydraulic excavator 1 as viewed from above. FIG. 6 depicts the warning zone S1 and the caution zone S2 of the hydraulic excavator 1. As depicted in FIG. 6, the caution zone S2 is a circular range of a maximum swing radius Rx of the hydraulic excavator 1. The maximum swing radius Rx corresponds to a length from a swing central axis O of the swing structure 3 to a distal end of the bucket 13 when the work device 10 is extended most toward the front (in a direction orthogonal to the swing central axis). In other words, the maximum swing radius Rx corresponds to a maximum length from the swing central axis O to a position reached by the work device 10 in the direction orthogonal to the swing central axis O. Incidentally, while the caution zone S2 is the circular range of the maximum swing radius Rx in the present embodiment, a circular range of a radius obtained by adding an allowance value (margin) to the maximum swing radius Rx may be set as the caution zone S2. The caution zone S2 is determined in advance on the basis of dimensions of various parts of the hydraulic excavator 1, and is stored in the caution zone storage section 117 of the ROM 112.

The warning zone S1 is a range set so as to be included in the caution zone S2. The warning zone S1 is preset in peripheral regions in the vicinity of the machine body 4, that is, a region within the swing range of the machine body 4 and a region close to the machine body 4 including the swing trajectories of the boom 11, the arm 12, and the bucket 13. The warning zone S1 is set in order to prevent contact between the object present within the range of the warning zone S1 and the hydraulic excavator 1 when swing operation of the swing structure 3 and travelling operation of the track structure 2 are performed.

The warning zone setting section 114 sets the warning zone S1 on the basis of the posture information of the hydraulic excavator 1 which is sensed by a posture sensor 60. The posture sensor 60 includes: a boom angle sensor 61 that senses the angle of the boom 11 (boom angle) with respect to the swing structure 3; an arm angle sensor 62 that senses the angle of the arm 12 (arm angle) with respect to the boom 11; a bucket angle sensor 63 that senses the angle of the bucket 13 (bucket angle) with respect to the arm 12; and a swing angle sensor 64 that senses the angle of the swing structure 3 (swing angle) with respect to the track structure 2. The boom angle sensor 61, the arm angle sensor 62, the bucket angle sensor 63, and the swing angle sensor 64 are, for example, a potentiometer that outputs a signal (voltage) corresponding to the angle obtained.

The ROM 112 store a left set angle θL, a right set angle θR, and dimension data of various parts of the work device 10. In the present embodiment, supposing that an x-axis extending in the forward-rearward direction of the track structure 2 is set as a reference (zero degrees), that a left swing direction is set as a negative direction, and that a right swing direction is set as a positive direction, the left set angle θL is set at −90 degrees, and the right set angle θR is set at +90 degrees.

The warning zone setting section 114 computes, as a work radius Rw, a length obtained by adding a predetermined length as an allowance value (margin) to the length from the swing central axis O to the distal end of the bucket 13 on the basis of the posture information sensed by the posture sensor 60 (the boom angle, the arm angle, and the bucket angle) and the dimension data of the various parts of the work device 10 (a length from the boom pin 11*b* to the arm pin 12*b*, a length from the arm pin 12*b* to the bucket pin 13*b*, and a length from the bucket pin 13*b* to the distal end of the bucket). The warning zone setting section 114 sets, as the warning zone S1, a region obtained by synthesizing a sectorial (semicircular) region S11 in front of the swing structure 3 which is defined by the left set angle θL, the right set angle θR, and the work radius Rw and a circular region (that is, the swing range of the machine body 4) S12 having a distance from the swing central axis O to an outermost peripheral portion of the swing structure 3 (rear portion of the swing structure 3) as a radius Rs.

Figure 7:
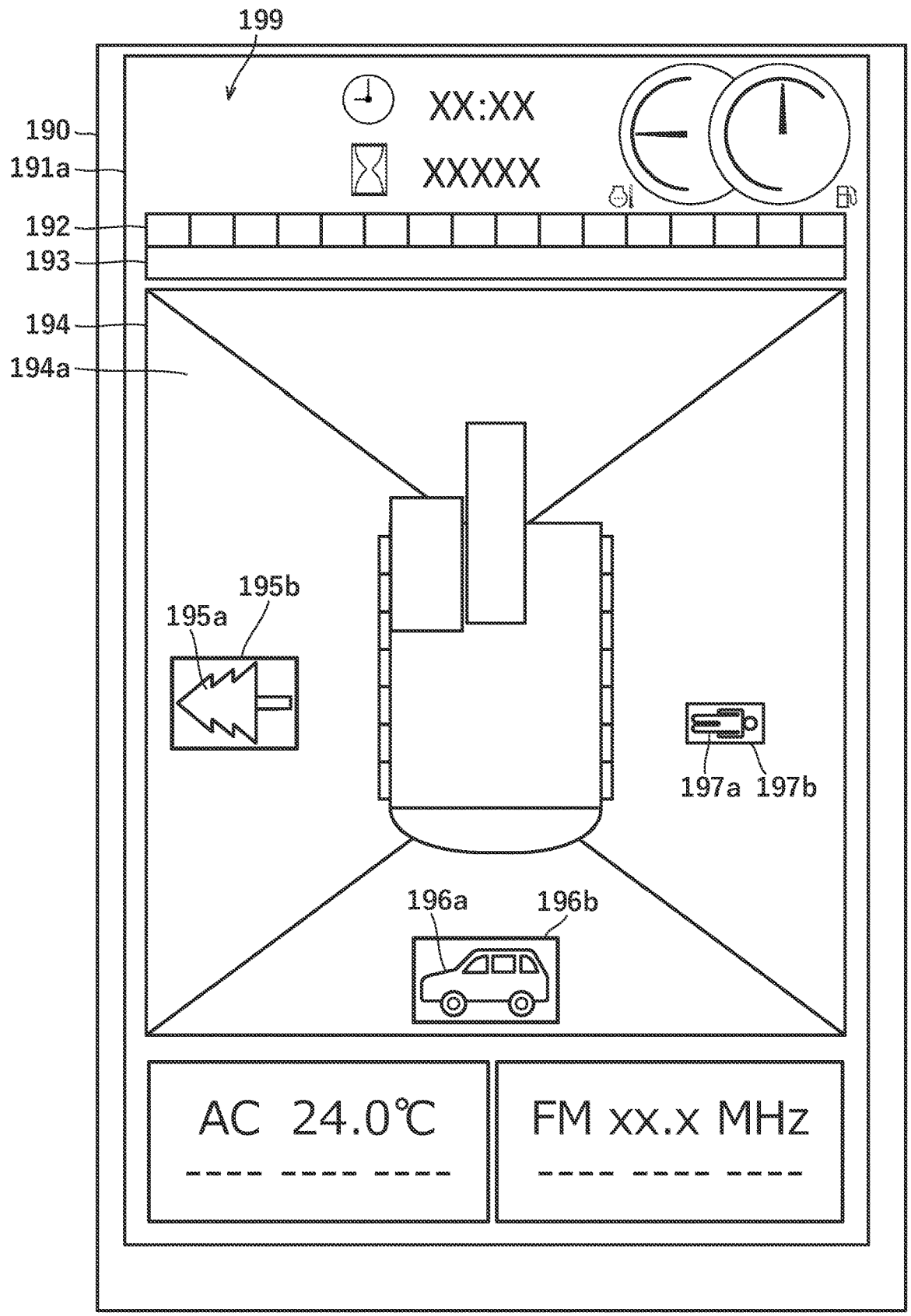
FIG. 7 is a diagram depicting an example of a synthetic video displayed on a display screen of a display device.

As depicted in FIG. 5, the monitor controller 120 functions as a bird's-eye video generating section 124 and a synthetic video generating section 125 by executing a program stored in the ROM 122. The bird's-eye video generating section 124 obtains images photographed by the left camera 31, the right camera 32, the front camera 33, and the rear camera 34, and generates a bird's-eye video on the basis of the obtained images. The bird's-eye video generating section 124 performs lens distortion correction on the obtained images, and further performs processing of viewpoint conversion into an upward viewpoint image. The bird's-eye video generating section 124 synthesizes the image obtained by performing the viewpoint conversion processing and an illustration image (or a photographed image) of the hydraulic excavator 1 as viewed from above, and thereby generates a bird's-eye video 194a as depicted in FIG. 7. The illustration image (or the photographed image) of the hydraulic excavator 1 as viewed from above is stored in the ROM 122 in advance.

FIG. 7 is a diagram depicting an example of the synthetic video 199 displayed on the display screen 191a of the display device 190. As depicted in FIG. 7, the synthetic video generating section 125 synthesizes rectangular frame images 195b, 196b, and 197b enclosing objects 195a, 196a, and 197a identified by the object identifying section 115 with the bird's-eye video 194a generated by the bird's-eye video generating section 124, and displays the synthesized bird's-eye video 194a in a camera image region 194. The synthetic video generating section 125 displays, in different colors, the frame image 197b enclosing the object determined to be a human in the object identifying section 115 and the frame images 195b and 196b enclosing the objects determined not to be a human in the object identifying section 115. For example, suppose that the frame image 197b is red, and that the frame images 195b and 196b are yellow.

On the display screen 191a of the display device 190, an icon region 192 displaying a predetermined icon and a message region 193 displaying a predetermined message are formed above the camera image region 194 displaying the bird's-eye video 194a as depicted in the figure.

When the machine controller 110 determines that a recording and retaining condition and predetermined conditions (the fourth condition and the sixth condition) constituting the recording and retaining condition are satisfied, the synthetic video generating section 125 displays a warning message image for notifying the operator of the satisfaction of the recording and retaining condition or the like and calling attention in the message region 193. The warning message image is, for example, a message image preset for each condition satisfied, such as a message image notifying that a human (or an object other than a human) is present within the warning zone S1. These message images are stored in the ROM 122, selected according to the satisfied condition, and displayed in the message region 193. In addition, the synthetic video generating section 125 displays an icon image corresponding to the satisfied condition in the icon region 192.

When the recording and retaining condition is satisfied and the machine controller 110 is configured to perform such operation limiting control as to forcibly decrease the speed of the actuators, the synthetic video generating section 125 may display a warning message image for notifying the operator to the effect that operation is limited in the message region 193. In addition, the synthetic video generating section 125 may display an icon image for notifying the operator to the effect that operation is limited in the icon region 192.

Further, when an abnormality in the surrounding monitoring system 19 is detected, the synthetic video generating section 125 may display a warning message image for notifying the operator that an abnormality in the surrounding monitoring system 19 is detected in the message region 193. In addition, the synthetic video generating section 125 may display an icon image for notifying the operator that an abnormality in the surrounding monitoring system 19 is detected in the icon region 192.

Thus, by controlling the display device 190, the monitor controller 120 displays the synthetic video 199 obtained by synthesizing the video photographed by the photographing devices 30 and the image generated according to object sensing information (an image of a frame, a message, and an icon) on the display screen 191a of the display device 190.

As depicted in FIG. 5, the recording controller 140 functions as a recording control section 144 by executing a program stored in the ROM 144. The recording control section 144 obtains the synthetic video data generated by the synthetic video generating section 125, and continuously records the obtained synthetic video data as overwritable data in the constant recording section 151.

When the recording capacity of the constant recording section 151 reaches an upper limit, the recording control section 144 performs overwriting processing that sequentially deletes old synthetic video data recorded in the constant recording section 151, and rewrites new synthetic video data. When the recording control section 144 receives a recording trigger signal, the recording control section 144 determines that an event has occurred, and records and retains the synthetic video data generated by the synthetic video generating section 125. Specifically, the recording control section 144 stores synthetic video data of a predetermined period including time T0 at which the recording trigger signal is received as event video data in the event recording section 152.

Figure 8:
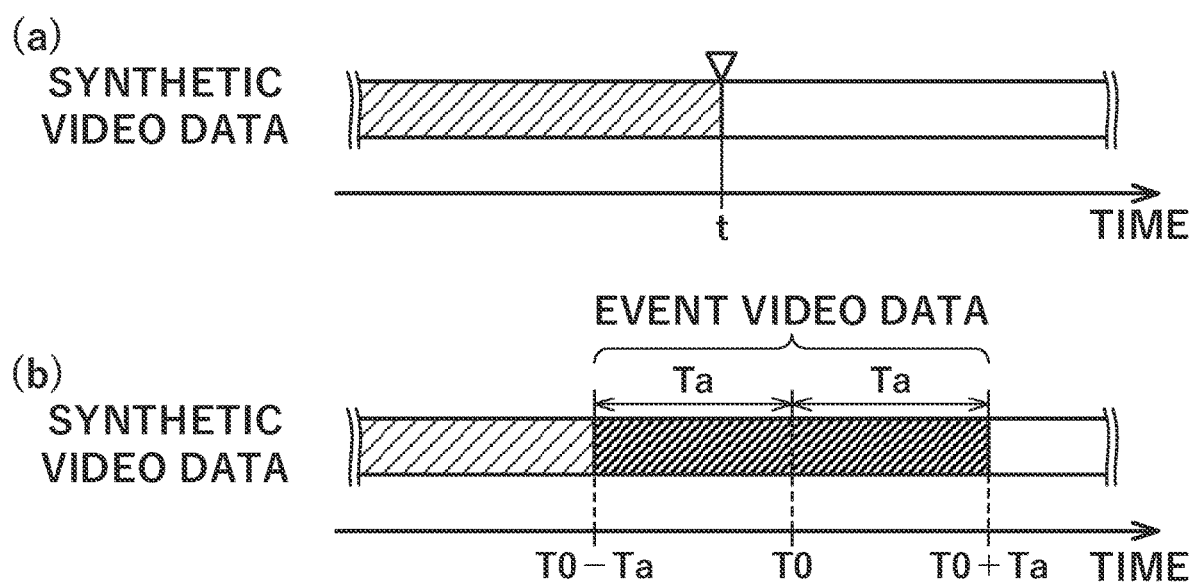
FIG. 8 is a timing diagram of assistance in explaining contents of recording control processing by a recording control section.

FIG. 8 is a timing diagram of assistance in explaining contents of recording control processing by the recording control section 144. As depicted in FIG. 8(a), the synthetic video data is recorded with the passage of time t in the constant recording section 151. As depicted in FIG. 8(b), when the recording trigger signal is received at time T0, for example, the synthetic video data of a period from a time (T0−Ta) before time T0 to a time (T0+Ta) after time T0 is stored as the event video data in the event recording section 152. Ta is approximately five minutes, for example. Incidentally, the time (2×Ta) of the synthetic video data stored as the event video data can be set optionally. In addition, the storage time of the event video data before time T0 at which the recording trigger signal is received and the storage time of the event video data after time T0 at which the recording trigger signal is received may be different from each other.

Figure 9:
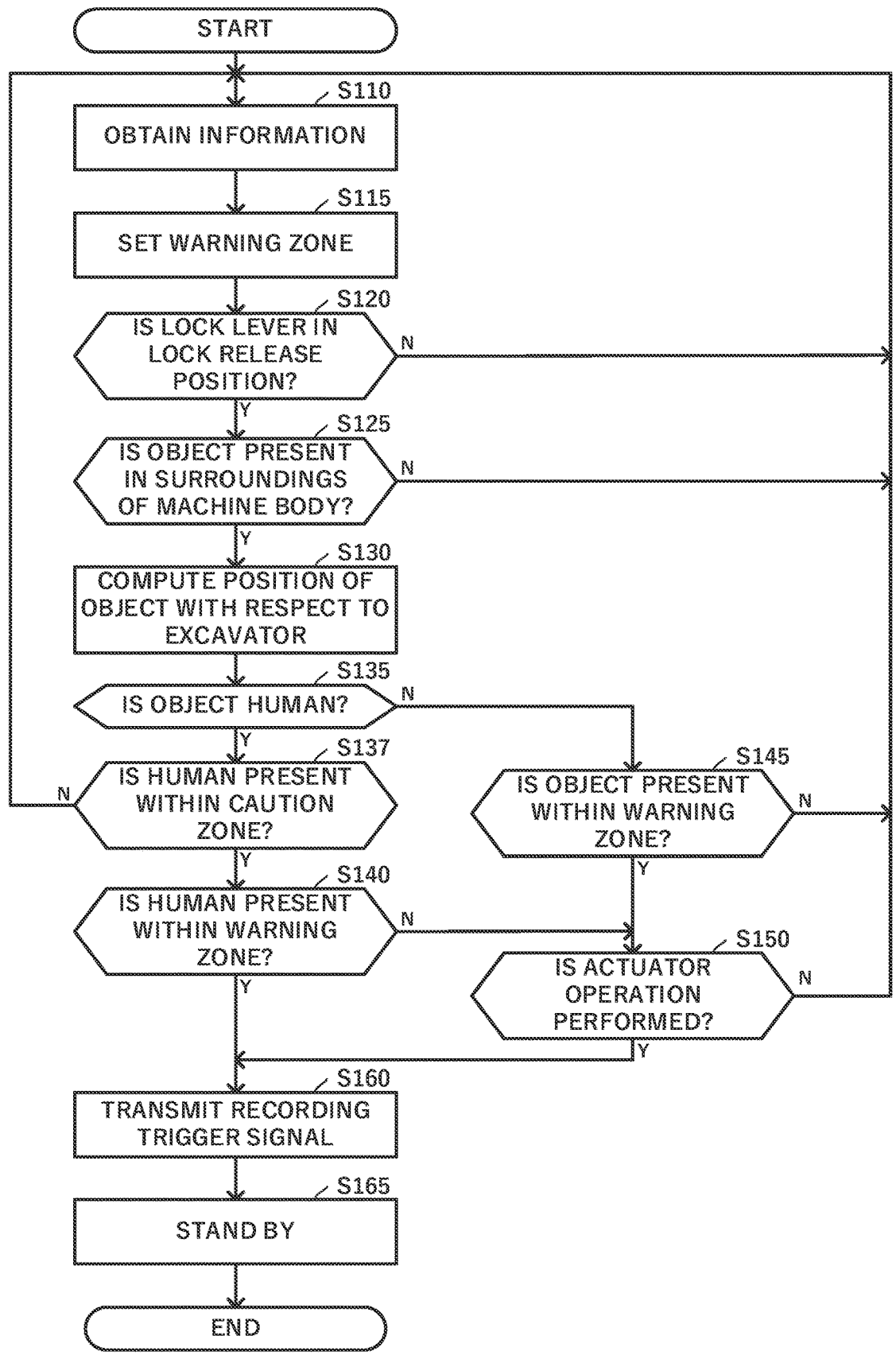
FIG. 9 is a flowchart depicting processing of determining whether a recording and retaining condition is satisfied, which processing is performed by a machine controller.

Referring to FIG. 9, there will be made a description of the contents of processing of determining whether a recording and retaining condition is satisfied, the processing being performed by the machine controller 110. The processing of a flowchart depicted in FIG. 9 is started by turning on an ignition switch (that is, turning a key on), for example. After an initial setting is made, processing of steps S110 to S165 is performed repeatedly.

As depicted in FIG. 9, in step S110, the machine controller 110 performs information obtainment processing, and proceeds to step S115. In the information obtainment processing (S110), the machine controller 110 obtains a result of sensing in the lock lever operation sensor 79*b* (information regarding the operation position of the lock lever 79*a*), results of sensing in the object sensors 90 (information regarding an object present in the surroundings of the machine body 4), results of sensing in the actuator operation sensors 70 (actuator operation information), and a result of sensing in the posture sensor 60 (posture information of the work device 10).

In step S115, the machine controller 110 computes the work radius Rw on the basis of the result of sensing in the posture sensor 60 which is obtained in step S110. Further, the machine controller 110 sets the warning zone S1 on the basis of the work radius Rw, the left set angle θL, and the right set angle R. The machine controller 110 then proceeds to step S120.

In step S120, the machine controller 110 determines whether or not the lock lever 79*a* is operated to the lock release position on the basis of the result of sensing in the lock lever operation sensor 79*b* which is obtained in step S110. When it is determined in step S120 that the lock lever 79*a* is operated to the lock release position, the processing proceeds to step S125. When it is determined in step S120 that the lock lever 79*a* is operated to the lock position, the processing returns to step S110.

In step S125, the machine controller 110 determines whether or not an object is present in the surroundings of the machine body 4 on the basis of the results of sensing in the object sensors 90 which are obtained in step S110. When it is determined in step S125 that an object is present in the surroundings of the machine body 4, the processing proceeds to step S130. When it is determined in step S125 that no object is present in the surroundings of the machine body 4, the processing returns to step S110.

In step S130, the machine controller 110 computes the position of the sensed object with respect to the excavator on the basis of the results of sensing in the object sensors 90 which are obtained in step S110. The machine controller 110 then proceeds to step S135.

In step S135, the machine controller 110 determines whether or not the sensed object is a human on the basis of the results of sensing in the object sensors 90 which are obtained in step S110. When it is determined in step S135 that the sensed object is a human, the processing proceeds to step S137. When it is determined in step S135 that the sensed object is not a human, the processing proceeds to step S145.

In step S137, the machine controller 110 determines whether or not the sensed human is present within the caution zone S2 on the basis of a computation result in step S130. When it is determined in step S137 that the sensed human is present within the caution zone S2, the processing proceeds to step S140. When it is determined in step S137 that the sensed human is not present within the caution zone S2, the processing returns to step S110.

In step S140, the machine controller 110 determines whether or not the sensed human is present within the warning zone S1 on the basis of the computation result in step S130. When it is determined in step S140 that the sensed human is present within the warning zone S1, the processing proceeds to step S160. When it is determined in step S140 that the sensed human is not present within the warning zone S1, the processing proceeds to step S150.

In step S145, the machine controller 110 determines whether or not the sensed object is present within the warning zone S1 on the basis of the computation result in step S130. When it is determined in step S145 that the sensed object is present within the warning zone S1, the processing proceeds to step S150. When it is determined in step S145 that the sensed object is not present within the warning zone S1, the processing returns to step S110.

In step S150, the machine controller 110 determines whether or not actuator operation is performed on the basis of the results of sensing in the actuator operation sensors 70 which are obtained in step S110. When it is determined in step S150 that actuator operation is performed, the processing proceeds to step S160. When it is determined in step S150 that actuator operation is not performed, the processing returns to step S110.

In step S160, the machine controller 110 determines that a recording and retaining condition is satisfied, and transmits a recording trigger signal to the video data recording device 130. The machine controller 110 then proceeds to step S165. In step S165, the machine controller 110 performs standby processing of standing by until a predetermined time Ta passes. The machine controller 110 then ends the processing depicted in the flowchart of FIG. 9.

Incidentally, a description has been made assuming a case where there is one object for the convenience of the description. In actuality, however, the machine controller 110 performs the processing of computing the position with respect to the excavator (S130), the human determination processing (S135), the processing of determining presence within the caution zone S2 (S137), and the processing of determining presence within the warning zone S1 (S140 and S145) for each object sensed, and determines whether or not a storing and retaining condition is satisfied for each object. The machine controller 110 transmits a recording trigger signal (S160) when any storing and retaining condition is satisfied as a result of determining whether the storing and retaining condition is satisfied for each object.

Figure 10A:
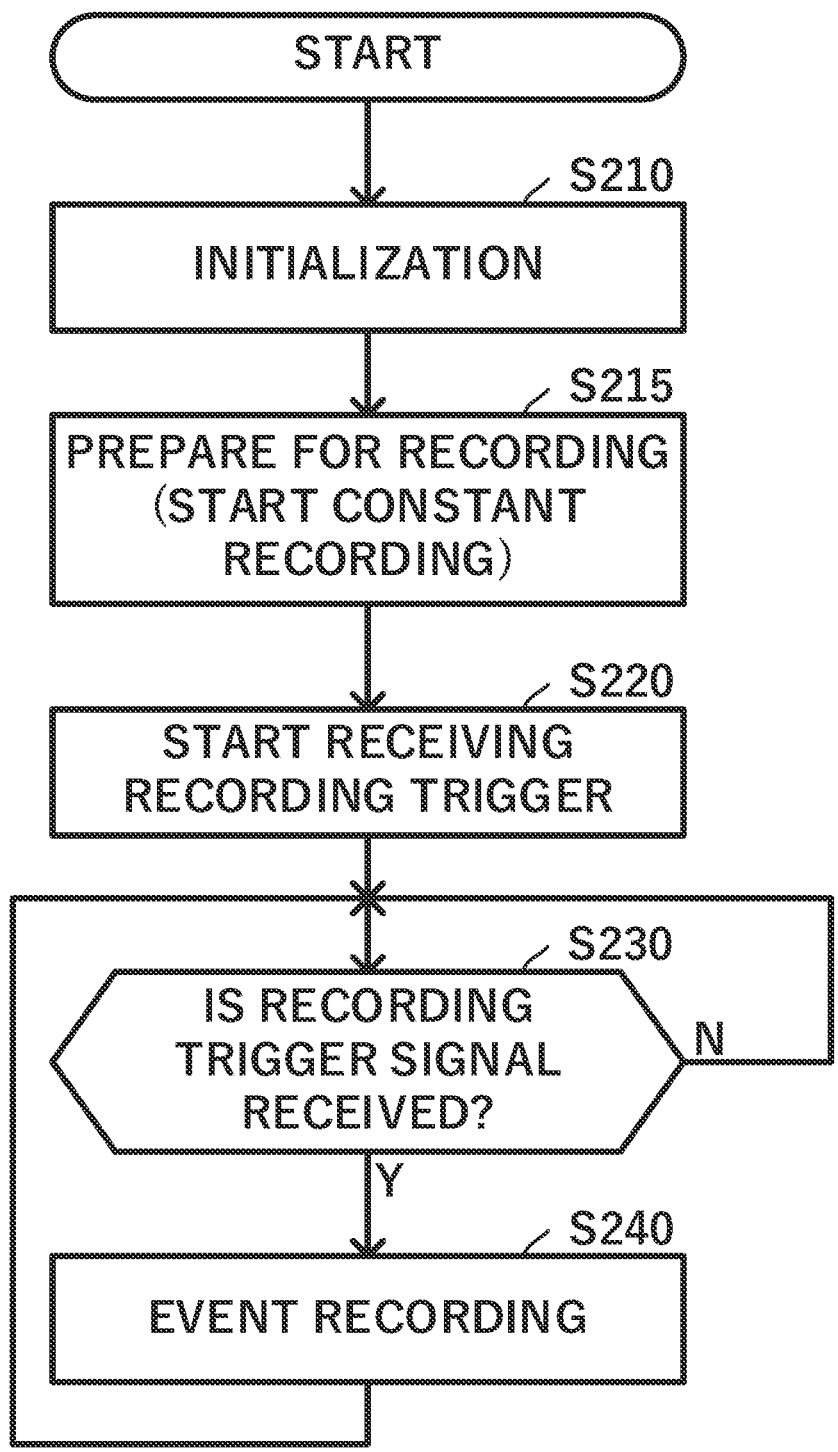
FIG. 10A is a flowchart depicting the recording control processing performed by a recording controller.

Referring to FIG. 10A, there will be made a description of contents of recording control processing performed by the recording controller 140. The processing of a flowchart depicted in FIG. 10A is started by turning on the ignition switch (that is, turning the key on), for example.

As depicted in FIG. 10A, in step S210, the recording controller 140 performs initialization processing. The recording controller 140 then proceeds to step S215. In step S215, the recording controller 140 performs recording preparation processing. In the recording preparation processing, the recording controller 140 starts constantly recording the synthetic video data generated by the monitor controller 120 in the constant recording section 151. The recording controller 140 determines that the recording preparation processing is completed when the predetermined time Ta has passed since a start time of the recording in the constant recording section 151. The recording controller 140 then proceeds to step S220.

In step S220, the recording controller 140 starts to receive a recording trigger signal from the machine controller 110. The recording controller 140 then proceeds to step S230. In step S230, the recording controller 140 determines whether or not a recording trigger signal from the machine controller 110 is received. The recording controller 140 repeatedly performs this determination processing until determining that a recording trigger signal is received from the machine controller 110. When determining that a recording trigger signal from the machine controller 110 is received, the recording controller 140 proceeds to step S240.

In step S240, the recording controller 140 stores the synthetic video data of a predetermined period [time (T0−Ta) to time (T0+Ta)] including time T0 at which the recording trigger signal is received as event video data in the event recording section 152. The recording controller 140 then returns to step S230.

Figure 10B:
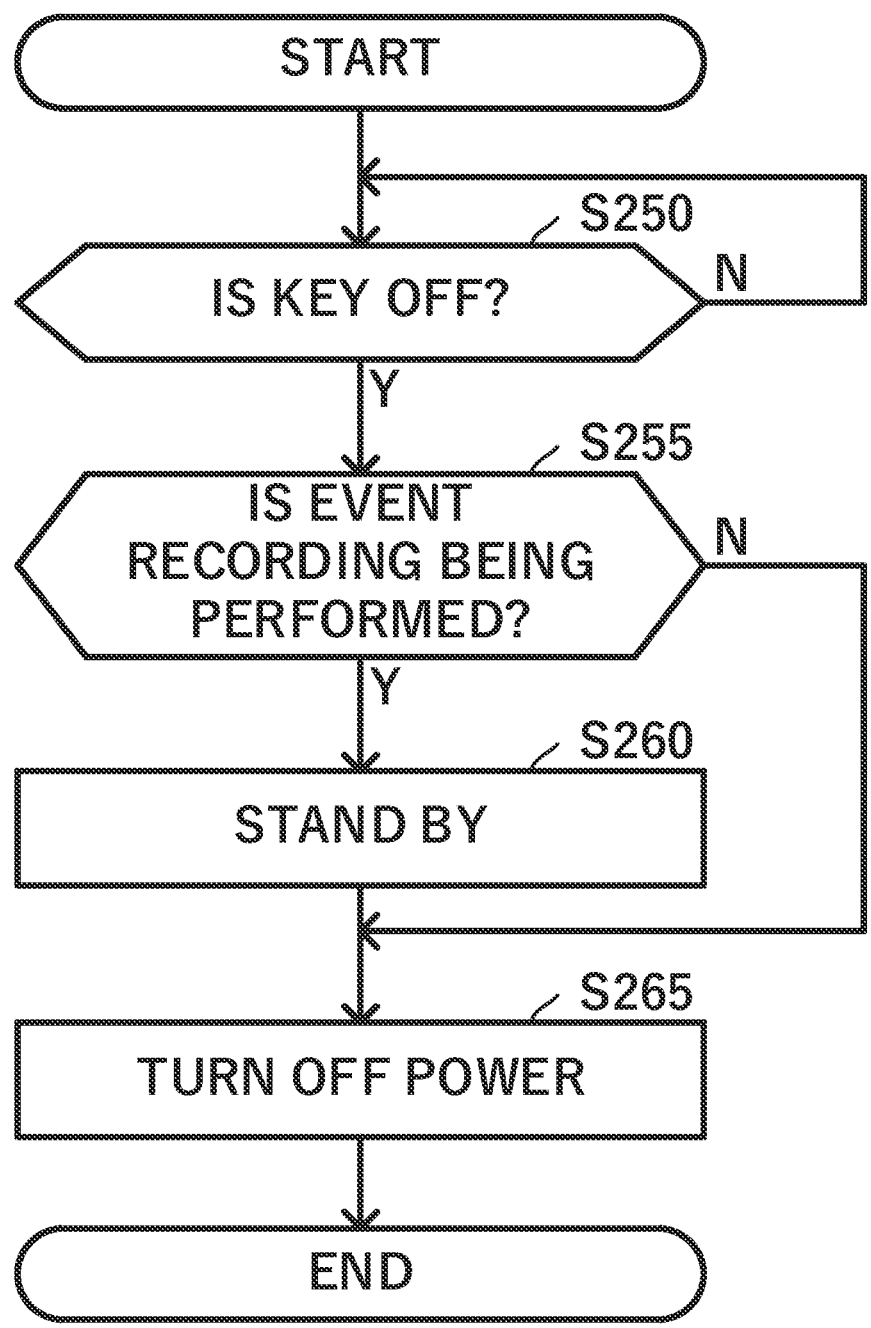
FIG. 10B is a flowchart depicting processing when recording control performed by the recording controller is ended.

Referring to FIG. 10B, there will be made a description of contents of processing when the recording control of the recording controller 140 is ended. The processing of a flowchart depicted in FIG. 10B is started by performing the processing of starting to receive a recording trigger (step S220 in FIG. 10A).

As depicted in FIG. 10B, in step S250, the recording controller 140 determines whether or not the ignition switch is turned off (that is, the key is turned off). The recording controller 140 repeatedly performs this determination processing until determining that the ignition switch is turned off. When determining that the ignition switch is turned off, the recording controller 140 proceeds to step S255.

In step S255, the recording controller 140 determines whether or not event recording processing (step S240) is being performed. When it is determined in step S255 that the event recording processing is being performed, the processing proceeds to step S260. When it is determined in step S255 that the event recording processing is not being performed, the processing proceeds to step S265. In step S260, the recording controller 140 performs standby processing of standing by until the predetermined time Ta passes. The recording controller 140 then proceeds to step S265. In step S265, the recording controller 140 performs predetermined ending processing, turns off power, and ends the processing depicted in the flowchart of FIG. 10B.

Main operation of the present embodiment will be described. When the operator gets in the cab 7, operates the lock lever 79*a* to the lock release position, and starts the engine 21 by turning on the ignition switch, constant recording of the video data recording device 130 is started (S215 in FIG. 10A).

When a worker is performing work in a region inside the caution zone S2 and outside the warning zone S1, and the operator performs an actuator operation, that is, any one of a travelling operation, a swing operation, and a work operation or a combined operation, a recording and retaining condition is satisfied (Y in S120 in FIG. 9→Y in S125→S130→Y in S135→Y in S137→N in S140→Y in S150). Therefore, a recording trigger signal is transmitted from the controller 100 to the video data recording device 130 (S160 in FIG. 9), and the video data recording device 130 records and retains synthetic video data (Y in S230 in FIG. 10A→S240). That is, the present embodiment can record and retain the synthetic video data due to the actuator operation of the operator when there is a possibility that the hydraulic excavator 1 approaches the worker.

When the worker enters the inside of the warning zone S1 from the caution zone S2, a recording and retaining condition is satisfied even when the operator is not performing any actuator operation (Y in S120 in FIG. 9→Y in S125→S130→Y in S135→Y in S137→Y in S140). Therefore, a recording trigger signal is transmitted from the controller 100 to the video data recording device 130 (S160 in FIG. 9), and the video data recording device 130 records and retains synthetic video data (Y in S230 in FIG. 10A→S240). That is, the present embodiment can record and retain the synthetic video data due to an actuator operation of the operator when the worker is present in the vicinity of the hydraulic excavator 1 and there is a possibility that the hydraulic excavator 1 comes into contact with the worker.

When a work vehicle such as a wheel loader or a dump truck is located within the warning zone S1, and the operator performs an actuator operation, a recording and retaining condition is satisfied (Y in S120 in FIG. 9→Y in S125→S130→N in S135→Y in S145→Y in S150). Therefore, a recording trigger signal is transmitted from the controller 100 to the video data recording device 130 (S160 in FIG. 9), and the video data recording device 130 records and retains synthetic video data (Y in S230 in FIG. 10A→S240). That is, the present embodiment can record and retain the synthetic video data due to an actuator operation of the operator when there is a possibility that the hydraulic excavator 1 comes into contact with the work vehicle.

The foregoing embodiment produces the following actions and effects.

(1) A hydraulic excavator (work machine) 1 includes: a machine body 4; an actuator (the hydraulic cylinder 10*a*, the travelling hydraulic motor 2*a*, and the swing hydraulic motor 3*a*) attached to the machine body 4; an operation device (the lock lever device 79 and the actuator operation devices 71, 72, and 73) used to operate the actuator (the hydraulic cylinder 10*a*, the travelling hydraulic motor 2*a*, and the swing hydraulic motor 3*a*); an operation sensor (the lock lever operation sensor 79*b* and the actuator operation sensors 70) that senses an operation of the operation device (the lock lever device 79 and the actuator operation devices 71, 72, and 73); a photographing device 30 that photographs surroundings of the machine body 4; a video data recording device 130 that records video data including video photographed by the photographing device 30; a controller 100 that controls the video data recording device 130; and an object sensor 90 that senses an object in the surroundings of the machine body 4. The controller 100 determines whether or not a recording and retaining condition including a condition that an object is present in the surroundings of the machine body 4 and a condition that the operation device is operated is satisfied on the basis of a result of sensing in the object sensor 90 and a result of sensing in the operation sensor (the lock lever operation sensor 79*b* and the actuator operation sensors 70), and makes the video data recording device 130 record and retain the video data when the recording and retaining condition is satisfied.

A technology that records and retains video data when an impact is detected is conventionally known. However, the hydraulic excavator 1 frequently causes an impact during operation. Therefore, when the hydraulic excavator 1 is configured to record and retain the video data in response to the detection of an impact, the video data is recorded and retained frequently, thus decreasing accuracy of recording and retaining video data of a necessary scene, that is, recording accuracy.

On the other hand, the present embodiment can record and retain the video data only in a scene in which there is a possibility that an object and the hydraulic excavator 1 approach each other or come into contact with each other, for example, when an operation of the hydraulic excavator 1 is performed while the object is present in the surroundings of the hydraulic excavator 1. That is, the present embodiment can improve accuracy of recording a necessary scene.

(2) When the video data is recorded and retained for a whole time during the operation of the hydraulic excavator 1, the capacity of the recording device is strained, causing such a risk that the video data of a necessary scene may be overwritten or that it may take time to perform work of extracting the video data of the necessary scene. On the other hand, in the present embodiment, recording and retaining of the video data is performed when a recording and retaining condition is satisfied, and therefore the amount of the video data can be reduced. Hence, it is possible to prevent a shortage of the capacity of the recording device (event recording section 152). Further, the work of extracting the necessary video data can be performed easily.

(3) The hydraulic excavator 1 includes a communication device 160 that transmits the recorded and retained video data to a management server (external device) 53 by wireless communication. As described above, in the present embodiment, the video data is recorded and retained when a recording and retaining condition is satisfied. The amount of the video data transmitted to the management server 53 can therefore be reduced. That is, according to the present embodiment, it is possible to keep down traffic when the video data is uploaded to the management server 53.

(4) The hydraulic excavator 1 includes a display device 190 disposed within the cab 7. The controller 100 generates synthetic video 199 by synthesizing the video photographed by the photographing device 30 and an image (a frame image, a message image, and an icon image) generated on the basis of the result of sensing in the object sensor 90, and displays the generated synthetic video 199 on the display screen 191*a* of the display device 190. The video data recorded and retained by the video data recording device 130 is data of the synthetic video 199 displayed on the display device 190. Thus, in the present embodiment, monitor video from a line of sight of the operator is recorded when a recording and retaining condition is satisfied. It is therefore possible to accurately look back at a situation when the recording and retaining condition is satisfied.

(5) The controller 100 determines that a first recording and retaining condition is satisfied and makes the video data recording device 130 record and retain the video data when the lock lever device 79 is operated to the lock release position and when an object is present in the surroundings of the machine body 4 and when the object is a human and when the object is present within a warning zone (first range) S1. According to this configuration, it is possible to record and retain the video data in a scene in which there is a possibility of contact between the human such as or a worker and the hydraulic excavator 1.

(6) The controller 100 determines that a second recording and retaining condition is satisfied and makes the video data recording device 130 record and retain the video data when the lock lever device 79 is operated to the lock release position and when an object is present in the surroundings of the machine body 4 and when the object is present within the warning zone (first range) S1 and when operation using at least one of the actuator operation devices 71, 72, and 73 is performed. According to this configuration, it is possible to record and retain the video data in a scene in which there is a possibility of contact between the object such as a work vehicle and the hydraulic excavator 1.

(7) The controller 100 determines that a third recording and retaining condition is satisfied and makes the video data recording device 130 record and retain the video data when the lock lever device 79 is operated to the lock release position and when an object is present in the surroundings of the machine body 4 and when the object is a human and when operation using at least one of the actuator operation devices 71, 72, and 73 is performed and when the object is not present within the warning zone (first range) S1 but is present within a caution zone (second range) S2. According to this configuration, it is possible to record and retain the video data in a scene in which there is a possibility of the human such as a worker and the hydraulic excavator 1 approaching each other.

The following modifications are also within the scope of the present invention, and it is possible to combine a configuration illustrated in a modification with a configuration described in the foregoing embodiment, or combine configurations described in different modifications in the following with each other.

First Modification

The controller 100 may determine that a recording and retaining condition is satisfied and make the video data recording device 130 record and retain the video data when the lock lever device 79 is operated to the lock release position and when an object is present in the surroundings of the machine body 4. That is, steps S115, S130, S135, S137, S140, S145, and S150 depicted in the flowchart of FIG. 9 may be omitted. Operation of the actuators by the actuator operation devices 71, 72, and 73 is enabled when the lock lever device 79 is operated to the lock release position. According to this configuration, it is possible to record and retain the video data in a scene in which there is a possibility that the object and the hydraulic excavator 1 approach each other or come into contact with each other.

Second Modification

The controller 100 may determine that a recording and retaining condition is satisfied and make the video data recording device 130 record and retain the video data when the lock lever device 79 is operated to the lock release position and when an object is present in the surroundings of the machine body 4 and when the object is a human. That is, steps S115, S130, S137, S140, S145, and S150 depicted in the flowchart of FIG. 9 may be omitted. Operation of an actuator(s) by at least one of the actuator operation devices 71, 72, and 73 is enabled when the lock lever device 79 is operated to the lock release position. According to this configuration, it is possible to record and retain the video data in a scene in which there is a possibility that the human and the hydraulic excavator 1 approach each other or come into contact with each other.

Third Modification

The controller 100 may determine that a recording and retaining condition is satisfied and make the video data recording device 130 record and retain the video data when operation using at least one of the actuator operation devices 71, 72, and 73 is performed and when an object is present in the surroundings of the machine body 4. That is, step S115 and steps S130 to S145 depicted in the flowchart of FIG. 9 may be omitted, and the processing of step S150 may be performed in place of the processing of step S120. According to this configuration, it is possible to record and retain the video data in a scene in which there is a possibility that the object and the hydraulic excavator 1 approach each other or come into contact with each other.

Fourth Modification

The controller 100 may make the video data recording device 130 record and retain the video data when a recording and retaining condition is satisfied, the recording and retaining condition including a condition that the lock lever device 79 is operated to the lock release position, a condition that an object is present in the surroundings of the machine body 4, and a condition that rotational speed (engine speed) of the engine 21 is changed. The controller 100 determines whether or not the engine speed is changed on the basis of a signal from an engine speed sensor that senses the engine speed. According to such a modification, when the operator starts work by operating the actuator operation devices 71, 72, and 73, and the engine speed is changed, the recording and retaining of the video data is started. It is therefore possible to record and retain the video data in a scene in which there is a possibility that the object and the hydraulic excavator 1 approach each other or come into contact with each other.

Fifth Modification

In the foregoing embodiment, there has been made a description of an example in which the left set angle θL defining the caution zone S2 is 90 degrees in the left swing direction with respect to the x-axis and the right set angle θR defining the caution zone S2 is 90 degrees in the right swing direction with respect to the x-axis. However, the present invention is not limited to this. The left set angle θL and the right set angle θR can be set at freely selected values. In addition, the left set angle θL and the right set angle θR may be allowed to be set optionally by the operator of the hydraulic excavator 1 by performing a predetermined operation on the display device (touch panel monitor) 190.

Sixth Modification

In the foregoing embodiment, there has been made a description of an example in which, as depicted in FIG. 6, a region obtained by synthesizing the sectorial (semicircular) region S11 defined by the left set angle θL, the right set angle θR, and the work radius Rw and the circular region S12 of the radius Rs which has the swing central axis O as a center thereof is set as the warning zone (first range) S1. However, the present invention is not limited to this. For example, a polygonal warning zone (first range) S1 having touch-operated positions as vertices thereof may be set by touch-operating a plurality of positions on the display screen of the display device (touch panel monitor) 190.

Seventh Modification

In the foregoing embodiment, there has been made a description of an example in which the synthetic video data is recorded and retained and transmitted to the management server 53. However, the present invention is not limited to this. The data of the video photographed by the photographing devices 30 may be recorded and retained as it is and transmitted to the management server 53.

Eighth Modification

In the foregoing embodiment, there has been made a description of an example in which the monitor controller 120 generates the bird's-eye video 194a on the basis of the video photographed by the plurality of photographing devices 30. However, the present invention is not limited to this. The monitor controller 120 may display the video photographed by the plurality of photographing devices 30 as individual videos on the display screen 191a of the display device 190.

Ninth Modification

In the foregoing embodiment, there has been made a description of an example in which the machine controller 110 and the monitor controller 120 are provided separately from each other. However, the present invention is not limited to this. The functions of the machine controller 110 and the monitor controller 120 may be implemented by one controller.

Tenth Modification

The actuator operation sensors 70 may be potentiometers or the like that sense operation angles (operation amounts) of the control levers 71a, 72a, and 73a. In this case, the controller 100 determines that operation using the actuator operation devices 71, 72, and 73 is performed when the absolute values |θ| of the operation angles θ of the control levers 71a, 72a, and 73a are equal to or more than a threshold value θ0 preset, and the controller 100 determines that operation using the actuator operation devices 71, 72, and 73 is not performed when the absolute values |θ| of the operation angles θ are less than the threshold value θ0. Incidentally, the operation angles of the control levers 71a, 72a, and 73a in a neutral position are 0 (zero) degrees, and a value larger than 0 (zero) is set as the threshold value θ0.

Eleventh Modification

In the foregoing embodiment, there has been made a description of an example in which the machine controller 110 determines whether or not an object is a human on the basis of reflection intensity information transmitted from the object sensors 90. However, a determining method is not limited to this. The object sensors 90 may determine whether or not the object is a human on the basis of the reflection intensity information, and output a result of the determination to the machine controller 110. In this case, the machine controller 110 determines whether or not the object is a human on the basis of the determination result (for example, a determination flag signal) transmitted from the object sensors 90.

Twelfth Modification

In the foregoing embodiment, there has been made a description of an example in which the object sensors 90 are infrared sensors. However, the present invention is not limited to this. The object sensors 90 may be stereo cameras. In this case, the stereo cameras function as the object sensors 90 and the photographing devices 30. The controller 100, for example, extracts a shape pattern of an object photographed by the stereo cameras. The controller 100 determines that the object is a human when the extracted pattern matches a preset human pattern. The controller 100 determines that the object is not a human when the extracted pattern does not match the preset human pattern. In addition, three-dimensional LiDAR may be adopted for the object sensors 90.

Thirteenth Modification

In the foregoing embodiment, there has been made a description of an example in which recording and retaining processing is ended when the predetermined time Ta passes from time T0 at which a recording trigger signal is received. However, the present invention is not limited to this. The recording and retaining processing may be ended when the recording and retaining condition ceases to be satisfied, for example, when the lock lever 79a is operated to the lock position or when the object sensors 90 cease to sense the object.

Fourteenth Modification

In the foregoing embodiment, there has been made a description of an example in which the constant recording section 151 and the event recording section 152 are separate recording devices. However, the constant recording section 151 and the event recording section 152 may be one recording device. In this case, the synthetic video data recorded constantly is overwritable, and the synthetic video data recorded for an event is made non-overwritable.

Fifteenth Modification

In the foregoing embodiment, there has been made a description of an example in which the actuator operation devices 71, 72, and 73 are hydraulic pilot operation devices. However, the present invention may be applied to electric operation devices. In addition, the actuators are not limited to hydraulic actuators, but the present invention is applicable also to electrically driven actuators.

Sixteenth Modification

In the foregoing embodiment, a description has been made by taking as an example a case where the work machine is the hydraulic excavator 1 of a crawler type. However, the present invention is not limited to this. The present invention is applicable to various work machines such as a wheeled hydraulic excavator and a wheel loader.

An embodiment of the present invention has been described above. However, the foregoing embodiment merely represents a part of examples of application of the present invention, and is not intended to limit the technical scope of the present invention to specific configurations of the foregoing embodiment.

DESCRIPTION OF REFERENCE CHARACTERS

1: Hydraulic excavator (work machine)
2a: Travelling hydraulic motor (actuator)
3a: Swing hydraulic motor (actuator)
4: Machine body
7: Cab
10: Work device
10a: Hydraulic cylinder (actuator)
19: Surrounding monitoring system
30: Photographing device
31, 32, 33, 34: Camera (photographing device)
53: Management server (external device)
60: Posture sensor
70: Actuator operation sensor
71: Work operation device (actuator operation device)
72: Swing operation device (actuator operation device)
73: Travelling operation device (actuator operation device)
76a, 76b: Work operation sensor (actuator operation sensor)
77a, 77b: Swing operation sensor (actuator operation sensor)
78a, 78b: Travelling operation sensor (actuator operation sensor)
79: Lock lever device
79b: Lock lever operation sensor
80: Hydraulic system
90: Object sensor
100: Controller
110: Machine controller
120: Monitor controller
130: Video data recording device
140: Recording controller
160: Communication device
190: Display device
191a: Display screen
192: Icon region
193: Message region
194: Camera image region
194a: Bird's-eye video
195a: Object
195b: Frame image
196a: Object
196b: Frame image
197a: Object
197b: Frame image
199: Synthetic video
S1: Warning zone (first range)
S2: Caution zone (second range)

The invention claimed is:

1. A work machine comprising:
a machine body;
an actuator attached to the machine body;
an operation device used to operate the actuator;
an operation sensor that senses an operation of the operation device;
a photographing device that photographs surroundings of the machine body;
a video data recording device that records video data including a video photographed by the photographing device;
a controller that controls the video data recording device; and an object sensor that senses an object in the surroundings of the machine body,
wherein the work machine includes, as the operation device:
an actuator operation device that commands operation of the actuator; and
a lock lever device selectively operated to a lock position that disables the operation of the actuator by the actuator operation device and a lock release position that enables the operation of the actuator by the actuator operation device, and
wherein the controller is configured to determine whether or not a recording and retaining condition including a condition that the lock lever device, as the operational device, is operated to the lock release position and a condition that an object is present in the surroundings of the machine body are satisfied on a basis of a result of sensing in the object sensor and a result of sensing in the operation sensor, and make the video data recording device record and retain the video data when the recording and retaining condition is satisfied.

2. The work machine according to claim 1, wherein the controller is configured to:
- determine whether or not the object sensed by the object sensor is a human; and
- make the video data recording device record and retain the video data when the recording and retaining condition including the condition that the lock lever device is operated to the lock release position, the condition that an object is present in the surroundings of the machine body, and a condition that the object is a human are satisfied.

3. The work machine according to claim 1, wherein the controller is configured to:
- determine whether or not the object sensed by the object sensor is present within a first range preset in a region in the surroundings of the machine body and close to the machine body; and
- make the video data recording device record and retain the video data when the recording and retaining condition including the condition that the lock lever device is operated to the lock release position, the condition that an object is present in the surroundings of the machine body, a condition that the object is a human, and a condition that the object is present within the first range are satisfied.

4. The work machine according to claim 1, wherein the controller is configured to:
- determine whether or not the object sensed by the object sensor is a human;
- determine whether the object sensed by the object sensor is present within a first range preset in a region in the surroundings of the machine body and close to the machine body or is present within a second range preset so as to include the first range;
- make the video data recording device record and retain the video data when a first recording and retaining condition including the condition that the lock lever device is operated to the lock release position, the condition that the object is present in the surroundings of the machine body, a condition that the object is a human, and a condition that the object is present within the first range are satisfied;
- make the video data recording device record and retain the video data when a second recording and retaining condition including the condition that the lock lever device is operated to the lock release position, the condition that the object is present in the surroundings of the machine body, a condition that the object is present within the first range, and a condition that operation using the actuator operation device is performed are satisfied; and
- make the video data recording device record and retain the video data when a third recording and retaining condition including the condition that the lock lever device is operated to the lock release position, the condition that an object is present in the surroundings of the machine body, a condition that the object is a human, a condition that operation using the actuator operation device is performed, and a condition that the object is not present within the first range but is present within the second range are satisfied.

5. The work machine according to claim 1, wherein the recording and retaining condition further includes a condition that an engine speed of the work machine is changed.

6. The work machine according to claim 1, further comprising:
- a communication device that transmits the recorded and retained video data to an external device by wireless communication.

7. The work machine according to claim 1, further comprising:
- a display device disposed within a cab, wherein
- the controller is configured to generate a synthetic video by synthesizing the video photographed by the photographing device and an image generated on a basis of the result of sensing in the object sensor, and display the generated synthetic video on a display screen of the display device, and
- the video data recorded and retained by the video data recording device is data of the synthetic video.

* * * * *